United States Patent [19]

Hayashi et al.

[11] Patent Number: 5,830,557
[45] Date of Patent: *Nov. 3, 1998

[54] NON-MAGNETIC UNDERCOATING LAYER FOR MAGNETIC RECORDING MEDIUM, MAGNETIC RECORDING MEDIUM AND NON-MAGNETIC PARTICLES

[75] Inventors: Kazuyuki Hayashi; Keisuke Iwasaki; Yasuyuki Tanaka; Minoru Ohsugi; Hiroko Morii; Mineko Sakoda; Norio Sugita; Masaaki Maekawa, all of Hiroshima, Japan

[73] Assignee: Toda Kogyo Corporation, Hiroshima-ken, Japan

[*] Notice: The term of this patent shall not extend beyond the expiration date of Pat. No. 5,587,232.

[21] Appl. No.: 392,199

[22] Filed: Feb. 22, 1995

Related U.S. Application Data

[62] Division of Ser. No. 240,512, May 10, 1994, Pat. No. 5,604,015.

[30] Foreign Application Priority Data

Dec. 27, 1993 [JP] Japan .................................... 5-353555
Dec. 27, 1993 [JP] Japan .................................... 5-353556

[51] Int. Cl.$^6$ .................................. G11B 5/66; G11B 5/70
[52] U.S. Cl. ........................... 428/143; 428/144; 428/145; 428/404; 428/405; 428/694 BS; 428/694 BN; 428/694 BR; 428/694 BA; 428/900
[58] Field of Search ..................................... 428/403, 402, 428/694 TS, 694 TM, 900, 141, 143, 144, 145, 404, 405, 694 BS, 694 BN, 694 BR, 694 BA

[56] References Cited

FOREIGN PATENT DOCUMENTS

| | | |
|---|---|---|
| 0 452 039 | 10/1991 | European Pat. Off. . |
| 0 552 611 | 7/1993 | European Pat. Off. . |
| 51-66320 | 12/1974 | Japan . |
| 51-47923 | 4/1976 | Japan . |
| 54-7292 | 5/1979 | Japan . |
| 62-128930 | 11/1987 | Japan . |
| 62-295217 | 12/1987 | Japan . |
| 63-187418 | 8/1988 | Japan . |
| 4-15172 | 3/1992 | Japan . |
| 4-167225 | 6/1992 | Japan . |
| 4-55979 | 9/1992 | Japan . |
| 5-182177 | 7/1993 | Japan . |
| 5-57214 | 8/1993 | Japan . |

*Primary Examiner*—Paul J. Thibodeau
*Assistant Examiner*—Stephen Sand
*Attorney, Agent, or Firm*—Nixon & Vanderhye P.C.

[57] ABSTRACT

The disclosure describes a non-magnetic undercoating layer for a magnetic recording medium, coated on the surface of a non-magnetic substrate comprising:

non-magnetic particles selected from the group consisting of particles (1) and (2):

(1) coated acicular or spindle-shaped $\alpha\text{-Fe}_2\text{O}_3$ particles which are produced by adhering not less than 0.01 to 20 wt % (calculated as Al, $SiO_2$ or Al and $SiO_2$, and based on acicular or spindle-shaped $\alpha\text{-Fe}_2\text{O}_3$ particles as a core material) of an oxide or a hydroxide containing Al, Si or both Al and Si to the surfaces of acicular or spindle-shaped $\alpha\text{-Fe}_2\text{O}_3$ particles as a core material, and have a molecular weight-dependent parameter $\alpha$ represented by the following formula of not less than 0.5:

$$As = K_1 \cdot M^\alpha$$

wherein M represents the number-average molecular weight of a binder resin, As represents the saturation adsorption of said binder resin, and $K_1$ represents a constant used for measuring As and dependent on the binder resin and a solvent, (2) $BaO \cdot 4.5Fe_2O_3$ particles having an average particle diameter of not more than 0.1 $\mu$m; and a binder resin.

12 Claims, 1 Drawing Sheet

( X 100.000)

(X 100,000)

NON-MAGNETIC UNDERCOATING LAYER FOR MAGNETIC RECORDING MEDIUM, MAGNETIC RECORDING MEDIUM AND NON-MAGNETIC PARTICLES

This is a Division of application Ser. No. 08/240,512, filed May 10, 1994, now U.S. Pat. No. 5,604,015.

BACKGROUND OF THE INVENTION

The present invention relates to a non-magnetic undercoating layer for a magnetic recording medium, a magnetic recording medium having a non-magnetic undercoating layer, and non-magnetic particles for a non-magnetic undercoating layer. More particularly, the present invention relates to a non-magnetic undercoating layer for a magnetic recording medium which has an excellent surface smoothness and a high strength, or which has an excellent surface smoothness, a high strength and protection property against oscillation (vibration proofness), a magnetic recording medium having such a non-magnetic undercoating layer, and non-magnetic particles for such a non-magnetic undercoating layer.

With a development of miniaturized and lightweight video or audio magnetic recording and reproducing apparatuses for long-time recording, magnetic recording media such as a magnetic tape and magnetic disk have been strongly required to have a higher performance, namely, a higher recording density and to reduce the noise level.

Especially, video tapes are required to have a higher picture quality, and the frequencies of carrier signals recorded in recent video tapes are higher than those recorded in conventional video tapes. In other words, the signals in the shortwave region have come to be used and, as a result, the magnetization depth from the surface of a magnetic tape has come to be remarkably small (shallow).

With respect to signals having a short wavelength, effort has also been made to improve the high output characteristics, especially, the S/N ratio, as described in the following literature. For example, *Development of Magnetic Materials and Technique for High Dispersion of Magnetic Powder*, published by Kabushiki Kaisha Sogo Gijutsu Center (1982) says on page 74, " . . . In the recording and reproducing characteristics, technical problems in designing a magnetic coating layer so as to produce a high recording density by achieving various requirements in electromagnetic conversion property such as a reduction in the noise level, improvement of the S/N ratio, the sensitivity and the frequency characteristics, and a reduction in the output fluctuation are (1) to improve the uniform dispersibility of magnetic particles and the magnetic orientation, (2) to increase the packing ratio of magnetic particles in a coating film, and (3) to provide a coating film with an excellent surface smoothness and a uniform thickness. . . . ", and on page 312, " . . . the conditions for high-density recording in a coating type tape are that the noise level is low with respect to signals having a short wavelength and that the high output characteristics are maintained. To satisfy these conditions, it is necessary that the tape has large coercive force (Hc) and residual magnetization (Br), . . . and the coating film has a smaller thickness. . . . ".

Development of a thinner film for a magnetic recording some problems.

Firstly, it is necessary to make a magnetic recording layer smooth and to eliminate the non-uniformity of thickness. As well known, in order to obtain a smooth magnetic recording layer having a uniform thickness, the surface of the base film must also be smooth. This fact is described on pages 180 and 181 of *Materials for Synthetic Technology-Causes of Abrasion of Magnetic Tape and Head Running System and Measures for Solving the Problem* (hereinunder referred to as "*Materials for Synthetic Technology*" (1987), published by the publishing department of Technology Information Center, " . . . the surface roughness of a hardened magnetic layer depends on the surface roughness of the base film (back surface roughness) so largely as to be approximately proportional, . . . since the magnetic layer is formed on the surface of the base film, the more smooth the surface of the base film is, the more uniform and larger head output is obtained and the more the S/N ratio is improved."

Secondly, a problem in the strength of a base film has been caused with a tendency of the decreasde in the thickness of a base film in response to the demand for a thinner magnetic layer. This fact is described, for example, on page 77 of the above-described *Development of Magnetic Materials and Technique for High Dispersion of Magnetic Powder*, " . . . Higher recording density is a large problem assigned to the present magnetic tape. This is important in order to shorten the length of the tape so as to miniaturize a cassette and to enable long-time recording. For this purpose, it is necessary to reduce the thickness of a base film . . . . With the tendency of reduction in the film thickness, the stiffness of the tape also reduces to such an extent as to make smooth traveling in a recorder difficult. Therefore, improvement of the stiffness of a video tape both in the machine direction and in the transverse direction is now strongly demanded . . . ."

Thirdly, there is a problem of too large a light transmittance caused by ultra-fine magnetic particles and a thin magnetic layer. Travel of a magnetic recording medium such as a magnetic tape, especially, a video tape is stopped when the video deck detects a portion of the magnetic recording medium at which the light transmittance is large. If the light transmittance of the whole part of a magnetic recording layer is made large by the production of a thinner magnetic recording medium or the ultra-fine magnetic particles dispersed in the magnetic recording layer, it is difficult to detect the portion having a large light transmittance by a video deck. As a measure for reducing the light transmittance of the whole part of a magnetic recording layer, carbon black or the like is added to the magnetic recording layer. It is, therefore, essential to add carbon black or the like to a magnetic recording layer in the video tapes.

Also, when a magnetic tape runs, it comes into vibrating by contacting with a magnetic head. The vibration has a close relationship with the thickness of a magnetic recording layer, and the finer the magnetic particles become and the thinner the magnetic recording layer becomes, the larger the vibration of the magnetic tape is apt to become. In this case, the output envelope of the magnetic tape may lack uniformity, so that the electromagnetic conversion (signal recording) output becomes unstable. Therefore, a magnetic tape having a thin recording layer is also required almost never to vibrate when the magnetic tape runs (this property will hereinunder be referred to as "vibration proofness").

As examples of the related art regarding a magnetic recording medium composed of a non-magnetic substrate and at least one undercoating layer produced by dispersing non-magnetic particles in a binder, Japanese Patent Application Laid-Open (KOKAI) Nos. 63-187418 (1988), 4-167225 (1992) and 5-182177 (1993) will be cited.

Japanese Patent Application Laid-Open (KOKAI) No. 63-187418 (1988) proposes a magnetic recording medium comprising a non-magnetic substrate, at least one undercoating layer produced by dispersing non-magnetic particles in a binder, and a magnetic layer produced by dispersing ferromagnetic particles in a binder, wherein the ferromagnetic particles are ferromagnetic iron oxide particles, ferromagnetic cobalt-modified iron oxide particles or ferromagnetic alloy particles, the average major axial diameter of the ferromagnetic particles measured through a transmission electron microscope is less than 0.30 μm and the crystalline size thereof by X-ray diffraction is less than 300 Å. According to the specification of Japanese Patent Application Laid-Open (KOKAI) No. 63-187418 (1988), the non-magnetic particles used for the undercoating layer are carbon black, graphite, titanium oxide, barium sulfate, ZnS, $MgCO_3$, ZnO, CaO, γ-iron oxide, tungsten disulfite, molybdenum disulfite, boron nitride, MgO, $SnO_2$, $SiO_2$, $Cr_2O_3$, α-$Al_2O_3$, SiC, cerium oxide, corundum, synthetic diamond, α-iron oxide, garnet, quartzite, silicon nitride, silicon carbide, molybdenum carbide, boron carbide, tungsten carbide, titanium carbide, tripoli, diatomaceous, dolomite or the like.

Japanese Patent Application Laid-Open (KOKAI) No. 4-167225 (1992) proposes a magnetic recording medium produced by forming a magnetic layer on the surface of a non-magnetic substrate through an undercoating layer which contains acicular or spindle-shaped particles having an aspect ratio of more than 3.0 in a resin binder hardened when irradiated with an electromagnetic wave such as radioactive rays and ultraviolet rays.

Japanese Patent Application Laid-Open (KOKAI) No. 5-182177 (1993) proposes a magnetic recording medium comprising a non-magnetic substrate, a non-magnetic undercoating layer formed on the non-magnetic substrate by dispersing an inorganic powder in a binder, and an upper magnetic layer formed on the non-magnetic undercoating layer by dispersing a ferromagnetic powder in a binder while the non-magnetic undercoating layer is wet, wherein the thickness of the upper magnetic layer in the dried state is not more than 1.0 μm, and the non-magnetic undercoating layer contains a non-magnetic inorganic powder coated with an inorganic oxide. Japanese Patent Application Laid-Open (KOKAI) No. 5-182177 (1993) also proposes a magnetic recording medium comprising a non-magnetic substrate, a non-magnetic undercoating layer formed on the non-magnetic substrate by dispersing an inorganic powder in a binder, and an upper magnetic layer formed on the non-magnetic undercoating layer by dispersing a ferromagnetic powder in a binder while the non-magnetic undercoating layer is wet, wherein the thickness of the upper magnetic layer in the dried state is not more than 1.0 μm, the non-magnetic undercoating layer contains a non-magnetic inorganic powder coated with at least one inorganic oxide selected from the group consisting of $Al_2O_3$, $SiO_2$ and $ZrO_2$, the amounts of $Al_2O_3$, $SiO_2$ and $ZrO_2$ being 1 to 21 wt %, 0.04 to 20 wt % and 0.05 to 15 wt %, respectively, based on the total weight of the non-magnetic inorganic powder, the amount of the non-magnetic inorganic powder is 51 to 99.8 wt % based on the whole inorganic powder contained in the non-magnetic undercoating layer, and the non-magnetic inorganic powder contains rutile titanium dioxide as the main ingredient and 5 to 30 wt % of the inorganic oxide.

As described above, it is essential to add carbon black or the like to a magnetic recording layer in order to solve the problem of the light transmittance increasing by reducing the thickness of the magnetic recording layer.

However, addition of non-magnetic particles such as carbon black not only impairs the enhancement of the recording density but also reduces the magnetization depth from the surface of the magnetic tape. It is, therefore, unfavorable to add the non-magnetic particles to a magnetic recording layer.

With the development of a thinner film for a magnetic recording layer and a base film, a magnetic tape which has an excellent surface smoothness, a high strength and vibration proofness is now in the strongest demand, but no magnetic tape which satisfies all of these demands has been produced yet.

Japanese Patent Application Laid-Open (KOKAI) No. 63-187418 (1988) states that by providing at least one undercoating layer produced by dispersing non-magnetic particles in a binder on a non-magnetic substrate by the method disclosed therein, the light transmittance is improved and the problem of deterioration of the surface properties and signal recording property is solved.

As seen from the above, many materials such as hematite, barium salfate, titanium oxide, etc. are described in the specification of Japanese Patent Application Laid-Open (KOKAI) No. 63-187418 as non-magnetic particles and granular, acicular or spindle-shaped particles having particle diameter in a very wide range are said to be usable.

However, as a result of investigation of the above-described non-magnetic particles by the present inventors, it has been found that the surface smoothness and the strength are unsatisfactory not only when granular non-magnetic particles are used but also when acicular or spindle-shaped non-magnetic particles are used.

In the case of using acicular or spindle-shaped α-FeOOH particles which are described as the acicular or spindle-shaped particles in Japanese Patent Application Laid-Open (KOKAI) No. 4-167225, since much crystal water is contained in the surfaces of acicular or spindle-shaped α-FeOOH particles, the conformity of the particles with a binder resin and a solvent is so poor that the desired dispersibility is not obtained.

In order to obtain a high surface smoothness in a non-magnetic undercoating layer, it is necessary to disperse non-magnetic particles in a binder resin to a very high degree. The dispersibility of coatings for a non-magnetic undercoating layer composed of non-magnetic particles, a binder resin, a solvent, etc. can be expressed by a molecular weight-dependent parameter a (hereinunder referred to merely as "parameter α"), as described on pages 94 to 96 of *Explication and Applied Technique of Dispersion and Agglomeration* (1992), published by Kabushiki Kaisha Technosystem, " . . . Many natural and synthetic polymers are adsorbed onto the surface of colloidal particles and form a thick adsorption layer, which exerts a great influence on the stability of the dispersion system. The following relationship generally holds between the molecular weight (M) and the saturation adsorption (As) of a polymer:

$$As = K_1 \cdot M^\alpha$$

wherein $K_1$ is a constant characteristic of the system, and α is called a molecular weight-dependent parameter, which is also characteristic of the system, and changes between 0 and 1 depending upon the structure of the adsorption layer. . . . When α=1, the polymer is adsorbed at the end of a molecule. The saturation adsorption (As) is proportional to the molecular weight (M). In this system, since the polymer forms a forest of the deepest adsorption layers on the particle surfaces, a strong steric repulsion effect is produced and effectively contributes to the stability of the dispersion system . . . "

It has been found that when magnetic particles are obtained by coating the surface of an inorganic powder such as α-iron oxide with an inorganic oxide such as $Al_2O_3$ and $SiO_2$ as described in Japanese Patent Application Laid-Open (KOKAI) No. 5-182177 (1993), the parameters α is about 0.40 to 0.45, while the parameters α of the particles which are not subjected to such a surface coating treatment described in Japanese Patent Application Laid-Open (KOKAI) No. 5-182177 (1993) is about 0.28 to 0.34.

Accordingly, the present invention aims at providing a non-magnetic undercoating layer for a magnetic recording medium which has an excellent surface-smoothness and a high strength, and which enables a thin magnetic recording layer having a small light transmittance, an excellent surface smoothness and a uniform thickness to be formed thereon by using α-$Fe_2O_3$ particles having an excellent dispersibility which is expressed by an parameter α of larger than 0.50.

Although many materials such as γ-iron oxide, α-iron oxide, barium sulfate or the like are described in Japanese Patent Application Laid-Open (KOKAI) No. 63-187418 (1988) and the surface smoothness and the strength of a magnetic tape are improved, the vibration proofness thereof cannot be said to be satisfactory.

Accordingly, the present invention also aims at providing a non-magnetic undercoating layer for a magnetic recording medium which has an excellent surface smoothness, a high strength and a vibration proofness, and which enables a thin magnetic recording layer having an excellent surface smoothness and a uniform thickness to be formed thereon and a vibration-proof magnetic tape to be produced therefrom.

As a result of studies undertaken by the present inventors so as to achieve such aims, it has been found that a non-magnetic undercoating layer containing the following non-magnetic particles (1) and/or (2), has an excellent surface smoothness and a high strength, and that such the non-magnetic thin magnetic recording layer provided on the undercoating layer has a small light transmittance, an excellent surface smoothness and a uniform thickness.

(1) Coated acicular or spindle-shaped α-$Fe_2O_3$ particles which are produced by adhering an oxide or a hydroxide containing Al, Si or both Al and Si to the surfaces of acicular or spindle-shaped α-$Fe_2O_3$ particles, and in which the molecular weight-dependent parameter α represented by the following formula is not less than 0.5:

$$As = K_1 \cdot M^\alpha$$

wherein M represents the number-average molecular weight of a binder resin, As represents the saturation adsorption of the binder resin, and $K_1$ represents a constant used for measuring As and dependent on the binder resin and a solvent.

(2) BaO·4.5 $Fe_2O_3$ particles having an average particle diameter of not more than 0.1 μm.

On the basis of this finding, the present invention has been achieved.

SUMMARY OF THE INVENTION

It is an object of the present invention to provide a non-magnetic undercoating layer for a magnetic recording medium, which has an excellent surface smoothness and a high strength, and which can provide a magnetic recording medium with a thin magnetic recording layer, having a small light transmittance, an excellent surface smoothness and a uniform thickness by forming the magnetic recording layer thereon.

It is another object of the present invention to provide a non-magnetic undercoating layer for a magnetic recording medium, which has an excellent surface smoothness, a high strength and a vibration proofness, and which can provide a magnetic recording medium with a thin magnetic recording layer, having an excellent surface smoothness and a uniform thickness by forming the magnetic recording layer thereon.

To achieve these aims, in a first aspect of the present invention, there is provided a non-magnetic undercoating layer for a magnetic recording medium, which is coated on the surface of a non-magnetic substrate, comprising:

non-magnetic particles selected from the group consisting of particles (1) and (2):
(1) coated acicular or spindle-shaped α-$Fe_2O_3$ particles which are mechanochemical-treated by adhering 0.01 to 20 wt % (calculated as Al, $SiO_2$ or Al and $SiO_2$, and based on acicular or spindle-shaped α-$Fe_2O_3$ particles as a core material) of an oxide or a hydroxide containing Al, Si or both Al and Si to the surfaces of acicular or spindle-shaped α-$Fe_2O_3$ particles as a core material, and have a molecular weight-dependent parameter α represented by the following formula of not less than 0.5:

$$As = K_1 \cdot M^\alpha$$

wherein M represents the number-average molecular weight of a binder resin, As represents the saturation adsorption of said binder resin, and $K_1$ represents a constant used for measuring As and dependent on the binder resin and a solvent;
(2) BaO·4.5$Fe_2O_3$ particles having an average particle diameter of not more than 0.1 μm; and
a binder resin.

In a second aspect of the present invention, there is provided a non-magnetic undercoating layer for a magnetic recording medium, which is coated on the surface of a non-magnetic substrate, comprising:

non-magnetic particles of coated BaO·4.5$Fe_2O_3$ particles which have an average particle diameter of not more than 0.1 μm, and are surface-treated with a coating material selected from the group consisting of aluminum compounds, silica compounds, zinc compounds, zirconium compounds, silane coupling agents, titanate coupling agents, aluminate coupling agents, zirconate coupling agents and a mixture thereof; and
a binder resin.

In a third aspect of the present invention, there is provided a non-magnetic undercoating layer for a magnetic recording medium, which is coated on the surface of a non-magnetic substrate, comprising:

non-magnetic particles of coated BaO·4.5$Fe_2O_3$ particles which have an average particle diameter of not more than 0.1 μm, are mechanochemical-treated by adhering 0.01 to 20 wt % (calculated as Al, $SiO_2$ or Al and $SiO_2$, and based on BaO·4.5$Fe_2O_3$ particles as a core material) of an oxide or a hydroxide containing Al, Si or both Al and Si to the surfaces of BaO·4.5$Fe_2O_3$ particles as a core material, and have a molecular weight-dependent parameter α represented by the following formula of not less than 0.5:

$$As = K_1 \cdot M^\alpha$$

wherein M represents the number-average molecular weight of a binder resin, As represents the saturation adsorption of said binder resin, and $K_1$ represents a constant used for measuring As and dependent on the binder resin and a solvent; and a binder resin.

In a fourth aspect of the present invention, there is provided a non-magnetic undercoating layer for a magnetic recording medium, which is coated on the surface of a non-magnetic substrate, comprising:

non-magnetic particles of coated acicular or spindle-shaped α-Fe$_2$O$_3$ particles which are mechanochemical-treated by adhering 0.01 to 20 wt % (calculated as Al, SiO$_2$ or Al and SiO$_2$, and based on acicular or spindle-shaped α-Fe$_2$O$_3$ particles as a core material) of an oxide or a hydroxide containing Al, Si or both Al and Si to the surfaces of acicular or spindle-shaped α-Fe$_2$O$_3$ particles as a core material, and have a molecular weight-dependent parameter α represented by the following formula of not less than 0.5:

$$As = K_1 \cdot M^\alpha$$

wherein M represents the number-average molecular weight of a binder resin, As represents the saturation adsorption of said binder resin, and K$_1$ represents a constant used for measuring As and dependent on the binder resin and a solvent, which the non-magnetic particles are obtained by adding an aqueous alkali solution to an aqueous suspension containing acicular or spindle-shaped α-Fe$_2$O$_3$ particles to adjust the pH of said suspension to not less than 10, adding an aqueous solution containing Al, Si or both Al and Si to the resultant suspension, adjusting the pH of the resultant suspension to approximately the neutrality under stirring so as to quickly precipitate an oxide or hydroxide of Al, Si or both Al and Si, filtering out the obtained particles with said oxide or hydroxide so as to obtain a solid substance, washing with water and drying said solid substance, and compacting and pulverizing said solid substance by an edge runner mill; and a binder resin.

In a fifth aspect of the present invention, there is provided a non-magnetic undercoating layer for a magnetic recording medium, which is coated on the surface of a non-magnetic substrate, comprising:

non-magnetic particles of coated acicular or spindle-shaped α-Fe$_2$O$_3$ particles which are mechanochemical-treated by adhering 0.01 to 20 wt % (calculated as Al, SiO$_2$ or Al and SiO$_2$, and based on acicular or spindle-shaped α-Fe$_2$O$_3$ particles as a core material) of an oxide or a hydroxide containing Al, Si or both Al and Si to the surfaces of acicular or spindle-shaped α-Fe$_2$O$_3$ particles as a core material, and have a molecular-weight-dependent parameter α represented by the following formula of not less than 0.5:

$$As = K_1 \cdot M^\alpha$$

wherein M represents the number-average molecular weight of a binder resin, As represents the saturation adsorption of said binder resin, and K$_1$ represents a constant used for measuring As and dependent on the binder resin and a solvent, which the non-magnetic particles are obtained by adding an aqueous alkali solution to an aqueous suspension containing acicular or spindle-shaped α-Fe$_2$O$_3$ particles to adjust the pH of said suspension to not less than 10, adding an aqueous solution containing Al, Si or both Al and Si to the resultant suspension, adjusting the pH of the resultant suspension to approximately the neutrality under stirring so as to quickly precipitate an oxide or hydroxide of Al, Si or both Al and Si, filtering out the obtained particles with said oxide or hydroxide so as to obtain a solid substance, washing with water and drying said solid substance, and compacting and pulverizing said solid substance by an edge runner mill, and repeating the steps taken from the addition of said aqueous alkali solution to said aqueous suspension containing said particles so as to adjust the pH of said suspension to not less than 10 to the compaction and pulverization of said solid substance at least twice; and a binder resin.

In a sixth aspect of the present invention, there is provided coated acicular or spindle-shaped α-Fe$_2$O$_3$ particles for a non-magnetic undercoating layer for a magnetic recording medium, which are mechanochemical-treated by adhering 0.01 to 20 wt % (calculated as Al, SiO$_2$ or Al and SiO$_2$, and based on acicular or spindle-shaped α-Fe$_2$O$_3$ particles as a core material) of an oxide or a hydroxide containing Al, Si or both Al and Si to the surfaces of acicular or spindle-shaped α-Fe$_2$O$_3$ particles as a core material, and have a molecular-weight-dependent parameter α represented by the following formula is not less than 0.5:

$$As = K_1 \cdot M^\alpha$$

wherein M represents the number-average molecular weight of a binder resin, As represents the saturation adsorption of said binder resin, and K$_1$ represents a constant used for measuring As and dependent on said binder resin and a solvent.

In a seventh aspect of the present invention there is provided coated BaO·4.5Fe$_2$O$_3$ particles for a non-magnetic undercoating layer for a magnetic recording medium, which have an average particle diameter of not more than 0.1 μm, and are surface-treared with a coating material selected from the group consisting of aluminum compounds, silica compounds, zinc compounds, zirconium compounds, silane coupling agents, titanate coupling agents, aluminate coupling agents, zirconate coupling agents and a mixture thereof.

In an eighth aspect of the present invention, there is provided coated BaO·4.5Fe$_2$O$_3$ particles for a non-magnetic undercoating layer for a magnetic recording medium, which have an average particle diameter of not more than 0.1 μm, are mechanochemical-treated by adhering 0.01 to 20 wt % (calculated as Al, SiO$_2$ or Al and SiO$_2$, and based on BaO·4.5Fe$_2$O$_3$ particles as a core material) of an oxide or a hydroxide containing Al, Si or both Al and Si to the surfaces of BaO·4.5Fe$_2$O$_3$ particles as a core material, and have a molecular-weight-dependent parameter α represented by the following formula of not less than 0.5:

$$As = K_1 \cdot M^\alpha$$

wherein M represents the number-average molecular weight of a binder resin, As represents the saturation adsorption of said binder resin, and K$_1$ represents a constant used for measuring As and dependent on the binder resin and a solvent.

In a ninth aspect of the present invention, there is provided a magnetic recording medium, comprising:

a non-magnetic substrate;

a non-magnetic undercoating layer composed of non-magnetic particles and a binder resin, and formed on the surface of the non-magnetic substrate, non-magnetic particles being particles selected from the group consisting of particles (1) and (2):

(1) coated acicular or spindle-shaped $\alpha$-$Fe_2O_3$ particles which are mechanochemical-treated by adhering 0.01 to 20 wt % (calculated as Al, $SiO_2$ or Al and $SiO_2$, and based on acicular or spindle-shaped $\alpha$-$Fe_2O_3$ particles as a core material) of an oxide or a hydroxide containing Al, Si or both Al and Si to the surfaces of acicular or spindle-shaped $\alpha$-$Fe_2O_3$ particles as a core material, and have a molecular weight-dependent parameter $\alpha$ represented by the following formula of not less than 0.5:

$$As = K_1 \cdot M^\alpha$$

wherein M represents the number-average molecular weight of a binder resin, As represents the saturation adsorption of said binder resin, and $K_1$ represents a constant used for measuring As and dependent on the binder resin and a solvent, (2) $BaO \cdot 4.5Fe_2O_3$ particles having an average particle diameter of not more than 0.1 μm; and a magnetic recording layer composed of magnetic particles and a binder resin, and formed on said non-magnetic undercoating layer.

DETAILED DESCRIPTION OF THE INVENTION

Figure 1:
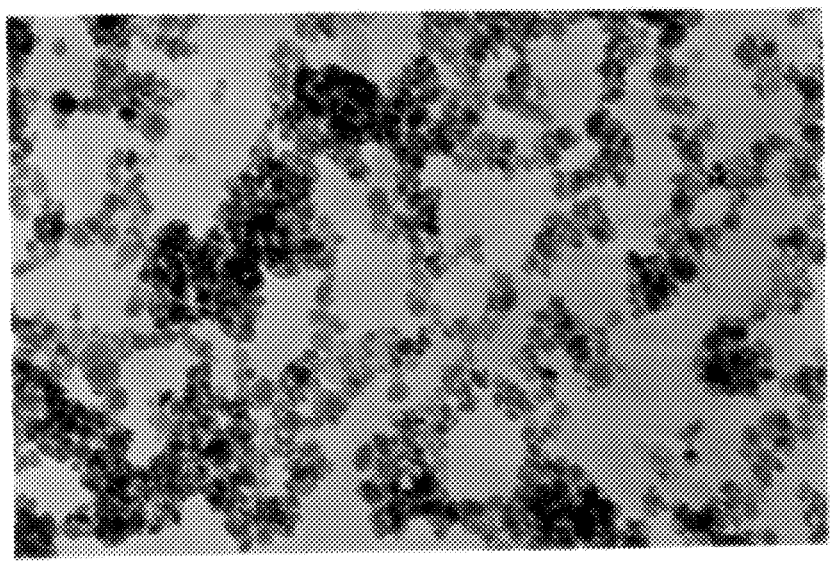
FIG. 1 is an electron micrograph (×100,000) of the structure of the $BaO \cdot 4.5Fe_2O_3$ particles produced in Example 17.

The precursor particles for the acicular or spindle-shaped $\alpha$-$Fe_2O_3$ particles used in the present invention are acicular or spindle-shaped goethite particles generally produced by:

(1) a process of oxidizing a suspension containing colloidal ferrous hydroxide particles and having a pH of not less than 11 which is obtained by adding not less than an equivalent of an alkali hydroxide solution to an aqueous ferrous salt solution, by passing an oxygen-containing gas thereinto at a temperature of not higher than 80° C.;

(2) a process of producing spindle-shaped goethite particles by oxidizing a suspension containing $FeCO_3$ which is obtained by reacting an aqueous ferrous salt solution with an aqueous alkali carbonate solution, by passing an oxygen-containing gas thereinto;

(3) a process of generating acicular or spindle-shaped seed goethite particles by oxidizing a ferrous hydroxide solution containing colloidal ferrous salt particles which is obtained by adding less than an equivalent of an alkali hydroxide solution or an alkali carbonate solution to an aqueous ferrous salt solution, by passing an oxygen-containing gas thereinto, adding not less than an equivalent of an alkali hydroxide solution to the aqueous ferrous salt solution containing the acicular or spindle-shaped goethite seed particles, and growing the acicular or spindle-shaped seed goethite particles by passing an oxygen-containing gas into the aqueous ferrous salt solution; and (4) a process of producing acicular or spindle-shaped goethite particles by oxidizing a ferrous salt solution containing colloidal ferrous hydroxide particles which are obtained by adding less than an equivalent of an alkali hydroxide solution or an alkali carbonate solution to an aqueous ferrous salt solution, by passing an oxygen-containing gas thereinto, and growing the acicular or spindle-shaped seed goethite particles in an acidic or neutral region.

The precursor particles obtained are heated, dehydrated and, if necessary, further heat-treated, thereby obtaining acicular or spindle-shaped $\alpha$-$Fe_2O_3$ particles. Alternatively, the acicular or spindle-shaped $\alpha$-$Fe_2O_3$ particles may be produced directly by oxidizing an aqueous solution containing $FeCO_3$ passing an oxygen-containing gas (refer to Japanese Patent Publication (KOKOKU) Nos. 4-15172, 4-55979 and 5-57214, and Japanese Patent Application Laid-Open (KOKAI) No. 62-128930).

Elements other than Fe such as Ni, Zn, P and Si which are generally added in order to enhance properties of the particles may be added during the reaction for producing goethite particles.

By dehydrating the acicular or spindle-shaped particles as the precursor particles at a temperature of 200° to 500° C. and heat-treating (annealing) the dehydrated particles, if necessary, at a temperature of 350° to 800° C., acicular or spindle-shaped $\alpha$-$Fe_2O_3$ particles are obtained.

There is no problem even if there is a sintering preventive such as P, Si, B, Zr and Sb on the surface of the acicular or spindle-shaped goethite particles.

It is preferable to heat-treat (anneal) the acicular or spindle-shaped $\alpha$-$Fe_2O_3$ particles at a temperature of 350° to 800° C., because due to the heat-melting the surfaces of the particles, the pores in the surfaces of the dehydrated acicular or spindle-shaped $\alpha$-$Fe_2O_3$ particles are filled in, and a smooth surface is obtained.

The acicular or spindle-shaped $\alpha$-$Fe_2O_3$ particles with an oxide or a hydroxide containing Al, Si or both Al and Si adhered (coated) to the surfaces thereof used in the present invention are produced by (i) steps of adding an aqueous alkali solution to an aqueous suspension containing the acicular or spindle-shaped $\alpha$-$Fe_2O_3$ particles which are produced by the above-mentioned process to obtain a suspension having a pH of to not less than 10, adding an aqueous solution containing Al, Si or both Al and Si to the resultant suspension, adjusting the pH of the resultant suspension to approximately the neutrality under stirring so as to quickly precipitate an oxide or hydroxide containing Al, Si or both Al and Si, filtering out the obtained particles with said oxide or hydroxide deposited and/or precipitated on the surface or periphery thereof, washing with water and drying the obtained solid substance, and compacting and pulverizing the solid substance by an edge runner mill so as to adhere an oxide or hydroxide containing Al and/or Si to the surface of the acicular or spindle-shaped particles; or (ii) steps of repeating the above-mentioned steps taken from said step of adding an aqueous alkali solution to an aqueous suspension containing acicular or spindle-shaped $\alpha$-$Fe_2O_3$ particles to obtain a suspension having a pH of not less than 10 to the step of compacting and pulverizing the solid substance by an edge runner mill at least twice to adhere an oxide or hydroxide containing Al and/or Si to the surface of the acicular or spindle-shaped $\alpha$-$Fe_2O_3$ particles.

In the above-mentioned process, after adding an aqueous alkali solution to the aqueous suspension containing the acicular or spindle-shaped $\alpha$-$Fe_2O_3$ particles to obtain the suspension having a pH to not less than 10, by adding an aqueous solution containing Al, Si or both Al and Si to the resultant suspension, the acicular or spindle-shaped $\alpha$-$Fe_2O_3$ particles can be sufficiently and uniformly mixed in the aqueous suspension because of the electric repulsion of the particles therein.

As the aqueous alkali solution for adjusting the pH of the suspension to not less than 10, aqueous solutions of sodium hydroxide, potassium hydroxide, ammonia water, etc. are usable.

As the aqueous solution containing Al, an aqueous solution of an alkali aluminate such as sodium aluminate and potassium aluminate, and an aqueous solution of an aluminum salt such as aluminum sulfate, aluminum chloride and aluminum nitrate are usable.

The amount of Al compound added is 0.01 to 20.0 wt % (calculated as Al) based on the acicular or spindle-shaped $\alpha$-$Fe_2O_3$ particles. If the amount is less than 0.01 wt %, the dispersibility in the binder resin is insufficient. Although the advantages aimed at in the present invention are obtained even if the amount exceeds 20.0 wt %, since the approximately full advantages are achieved, the addition of more than 20.0 wt % of the Al compound is not industrially expedient. With due consideration for the dispersibility of the target particles, the amount of Al compound added is preferably 0.05 to 10.0 wt % (calculated as Al) based on the acicular or spindle-shaped $\alpha$-$Fe_2O_3$ particles.

As the aqueous solution containing Si, aqueous solutions of sodium silicate, potassium silicate, colloidal silica, water glass #3 and the like are usable.

The amount of Si compound added is 0.01 to 20.0 wt % (calculated as $SiO_2$) based on the acicular or spindle-shaped $\alpha$-$Fe_2O_3$ particles. If the amount is less than 0.01 wt %, the dispersibility in the binder resin is insufficient. Although the advantages aimed at in the present invention are obtained even if the amount exceeds 20.0 wt %, since the approximately full advantages are achieved, the addition of more than 20.0 wt % of the Si compound is not industrially expedient. With due consideration for the dispersibility of the target particles, the amount of Si compound added is preferably 0.05 to 10.0 wt % (calculated as $SiO_2$) based on the acicular or spindle-shaped $\alpha$-$Fe_2O_3$ particles.

When a mixture of an aqueous solution containing Al and an aqueous solution containing Si is added to the suspension in the present invention, the amount of mixed solution added is 0.01 to 20.0 wt %, preferably 0.05 to 10.0 wt % (calculated as the total amount of Al and $SiO_2$) based on the acicular or spindle-shaped $\alpha$-$Fe_2O_3$ particles.

If the steps taken from the addition of an aqueous alkali solution to an aqueous suspension containing the acicular or spindle-shaped $\alpha$-$Fe_2O_3$ particles so as to adjust the pH of the suspension to not less than 10 to the compaction and pulverization of the solid substances composed of the acicular or spindle-shaped $\alpha$-$Fe_2O_3$ particles by an edge runner mill which will be described later are repeated at least twice, the amount of Al compound and/or Si compound added each time is determined with due consideration for the sum of the above-described amount of each compound. It is preferably 0.05 to 10.0 wt % (calculated as the total amount of Al and $SiO_2$) based on the acicular or spindle-shaped $\alpha$-$Fe_2O_3$ particles.

It is in order to adequately and uniformly mix the compound in the suspension containing the acicular or spindle-shaped $\alpha$-$Fe_2O_3$ particles having a pH of not less than 10 that the Al compound and/or the Si compound is added in the form of an aqueous solution. It is also possible to adequately dissolve and mix the Al compound and/or the Si compound in and with the suspension by adding it in the form of a crystal salt.

In the present invention, an aqueous solution of the Al compound and/or the Si compound is added to the suspension containing the acicular or spindle-shaped $\alpha$-$Fe_2O_3$ particles having a pH of not less than 10, and the pH of the resultant suspension is rapidly adjusted to approximately the neutrality (6.5 to 8.5) under stirring so as to quickly precipitate substantially the total amount of Al and/or Si as an oxide or hydroxide thereof and produce a solid substance of the acicular or spindle-shaped $\alpha$-$Fe_2O_3$ particles with an oxide or hydroxide thereof.

The time for adjusting the pH of the suspension for precipitating an oxide or hydroxide containing each element is in the range of 1 to 10 minutes. If the time exceeds 10 minutes, the oxide or hydroxide of Al and/or Si is sometimes precipitated on the surfaces of the acicular or spindle-shaped $\alpha$-$Fe_2O_3$ particles in layers. Therefore, after the precipitation of the oxide or hydroxide, the solid substance composed of the particles with the oxide or hydroxide are promptly filtered out under the ordinary conditions. The time may be less than 1 minute but it takes at least about 1 minute to precipitate Al and/or Si as an oxide or hydroxide.

As the acid for adjusting the pH of the suspension, sulfuric acid, hydrochloric acid, acetic acid, nitric acid, carbon dioxide gas, etc. are usable.

In order to enhance the strength and the durability of the non-magnetic undercoating layer for a magnetic recording medium while reducing the amount of solvent remaining in the undercoating layer after the coating film is dried, it is preferable to add a compound of one selected from the group consisting of Zn, Co, Ni, V, Mg, Ca, Sr, Ba, Bi and P in addition to the Al compound and/or the Si compound. In order to enhance the mechanical strength (scratch resistance) and the running durability while reducing the friction coefficient, it is preferable to add a compound of one selected from the group consisting of Zr, Ti, Hf and Mo in addition to the Al compound and/or the Si compound. In order to enhance the surface smoothness and the electrification property while reducing the surface resistance, it is preferable to add a compound of one selected from the group consisting of Sn, Sb, Ag, Pd, Cu and Fe in addition to the Al compound and/or the Si compound. Each of these compounds may be used in the form of a water-soluble salt such as sulfate, chloride and nitrate of each element.

These compounds may be appropriately combined with each other in accordance with the object of addition and the nature of each element, and the amount of compound added is 0.01 to 20.0 wt % (calculated as each element) based on the acicular or spindle-shaped $\alpha$-$Fe_2O_3$ articles. If the amount is less than 0.01 wt %, the dispersibility in the binder resin is insufficient. Although the advantages aimed at in the present invention are obtained even if the amount exceeds 20.0 wt %, since the advantages are saturated, the addition of more than 20.0 wt % of each compound is industrially useless. With due consideration for the dispersibility of the target particles, the amount of each compound added is preferably 0.05 to 10.0 wt % (calculated as each element) based on the acicular or spindle-shaped $\alpha$-$Fe_2O_3$ articles.

Among the above-described elements, Ca, Sr and Ba sometimes elute when substantially the total amount of precipitated oxide or hydroxide particles thereof are washed. To prevent this, they are preferably subjected to the following treatments. When a Ca compound is used and the suspension containing the Ca compound is neutralized with the above-described acid other than carbon dioxide gas, after the pH of the suspension is adjusted, a slight amount of carbon dioxide gas is blown into the suspension so as to bubble it. By this treatment, Ca ions are combined with carbon dioxide as $CaCO_3$, so that Ca is unlikely to elute. The same treatment may be adopted when an Sr compound is used so that Sr ions are combined with carbon dioxide as $SrCO_3$ and Sr is unlikely to elute. When a Ba compound is used, the suspension containing the Ba compound is preferably neutralized with sulfuric acid. When an acid other than sulfuric acid is used as the neutralizer, it is preferable to add sulfuric acid after the adjustment of the pH so as to combine Ba ions therewith as $BaSO_4$, whereby Ba ions are unlikely to elute.

The solid substances composed of the acicular or spindle-shaped $\alpha$-$Fe_2O_3$ particles and the oxide or hydroxide is filtered out, washed with water and dried by an ordinary method.

Since the solid substances exists by the interaction thereof, filtration, washing with water and drying of the mixture may be conducted by an ordinary method without particularly deteriorating the operability.

As the edge runner mill used for the compaction and pulverization of the solid substance in the present invention, "Sand Mill" manufactured by Kabushiki Kaisha Matsumoto Chuzo Tekkosho and "Mix Muller" manufactured by Shinto Industry Co., Ltd., etc. are usable.

The line load of the edge runner mill is 15 to 80 kg/cm, preferably 30 to 60 kg/cm. If the line load is less than 15 kg/cm, since the shearing force during grinding is too weak, it is impossible to exert the mechanochemical effect. On the other hand, if the line load exceeds 80 kg/cm, there is a fear of the particles themselves being broken. The treating time is 15 to 120 minutes, preferably 30 to 60 minutes.

In the present invention, the steps taken from the adding step of an aqueous alkali solution to an aqueous suspension containing acicular or spindle-shaped $\alpha$-$Fe_2O_3$ particles to obtain a suspension having a pH of not less than 10 to the compaction and pulverization step of the solid substances of the acicular or spindle-shaped $\alpha$-$Fe_2O_3$ particles with the oxide or hydroxide by an edge runner mill may be repeated twice or more, preferably two to five times. Although the advantages aimed at in the present invention are obtained even if the steps are repeated more than five times, approximately full advantages are achieved so that repeating the steps more is not industrially expedient.

The average major axial diameter of the coated acicular or spindle-shaped $\alpha$-$Fe_2O_3$ particles in the present invention is 0.05 to 0.25 $\mu$m, preferably 0.08 to 0.20 $\mu$m, the minor axial diameter is 0.010 to 0.035 $\mu$m, preferably 0.012 to 0.030 $\mu$m, the particle size distribution thereof in geometrical standard deviation is not more than 1.40, preferably 1.05 to 1.38 and the aspect ratio (major axial diameter/minor axial diameter) thereof is 2 to 20, preferably 3 to 10.

If the average major axial diameter is less than 0.05 $\mu$m, dispersion in the binder is unfavorably difficult. On the other hand if the average major axial diameter exceeds 0.25 $\mu$m, the particle size is so large as to impair the surface smoothness.

If the average minor axial diameter is less than 0.010 $\mu$m, dispersion in the binder is unfavorably difficult. On the other hand if the average minor axial diameter exceeds 0.035 $\mu$m, the particle size is so large as to impair the surface smoothness.

If the particle size distribution in geometrical standard deviation exceeds 1.40, the coarse particles exert deleterious influence on the surface smoothness of the coated film.

If the aspect ratio is less than 2, it is difficult to provide the coated film with the desired strength. On the other hand, if the aspect ratio exceeds 20, the interaction between the particles increases so much as to exert deleterious influence on the dispersion.

On the other hand, the $BaO \cdot 4.5Fe_2O_3$ particles in the present invention are non-magnetic particles having an average particle diameter of less than about 0.1 $\mu$m. With consideration for the dispersibility of the particles in a vehicle, the particle size is preferably in the range of 0.005 to 0.05 $\mu$m, more preferably 0.01 to 0.04 $\mu$m.

The $BaO \cdot 4.5Fe_2O_3$ particles are obtained by an autoclaving process of an alkali suspension which contains a ferric salt and Ba ions in the atomic ratio of $Fe^{3+}$ to Ba of 6 to 8/1 in a temperature range of 110° to 190° C. (Japanese Patent Application Laid-Open (KOKAI) No. 61-40007 (1986)), or by a process of blowing an oxidizing gas into an alkali $Fe(OH)_2$ suspension containing Ba ions in a temperature range of 35° to 95° C., thereby oxidizing $Fe^{2+}$ simultaneously with stirring of the suspension (Japanese Patent Application Laid-Open (KOKAI) No. 62-52133 (1988)).

The advantages aimed at in the present invention are also obtained when the suspension contains elements such as Co, Ti, Ni, Zn, P and Si, which are ordinarily added in order to enhance the properties of the $BaO \cdot 4.5Fe_2O_3$ particles or elements such as Mn and Mg derived from an iron raw material, a barium raw material, an alkali raw material and another raw material in the form of coprecipitates during the process of producing the $BaO \cdot 4.5Fe_2O_3$ particles.

The surface treatment of the $BaO \cdot 4.5Fe_2O_3$ particles which is ordinarily conducted for the purpose of improving the dispersibility of the particles in a vehicle can increase the packing amount of the particles in the undercoating layer, which leads to the enhancement of the vibration proofness.

As the surface-treating agent of the $BaO \cdot 4.5Fe_2O_3$ particles, at least one selected from the group consisting of aluminum compound, silica compound, zinc compound, zirconium compound and coupling agent is usable. The preferred surface treating agent is an aluminum compound, a coupling agent or a combination thereof.

The surface treatment of the $BaO \cdot 4.5Fe_2O_3$ particles may be conducted when the particles are in the form of a cake or a slurry after washed with water, or dried. Preferably the $BaO \cdot 4.5Fe_2O_3$ particles in the form of a cake or a slurry are subjected to surface treatment.

The surface treatment of the $BaO \cdot 4.5Fe_2O_3$ particles with aluminum compound, silica compound, zinc compound, zirconium compound or a mixture thereof is conducted by (i) dispersing and suspending the $BaO \cdot 4.5Fe_2O_3$ particles in a solution containing aluminum compound, silica compound, zinc compound, zirconium compound or a mixture thereof; or (ii) adding aluminum compound, silica compound, zinc compound, zirconium compound or a mixture thereof to an aqueous suspension containing the $BaO \cdot 4.5Fe_2O_3$ particles and adjusting the pH of the suspension, so as to coat the surfaces of the $BaO \cdot 4.5Fe_2O_3$ particles with an oxide and/or a hydroxide of aluminum, silica, zinc, zirconium or a mixture thereof, filtering out, washing with water, drying, pulverizing and, if necessary, deaerating and compacting the coated particles.

As the aluminum compound, an aluminum salt such as aluminum acetate, aluminum sulfate, aluminum chloride and aluminum nitrate and alkali salts such as aluminum salt and sodium aluminate are usable.

As the silica compound, sodium silicate, potassium silicate, colloidal silica and water glass #3 are usable.

As the zinc compound, zinc acetate, zinc sulfate, zinc chloride and zinc nitrate and are usable.

As the zirconium compound, zirconium acetate, zirconium sulfate, zirconyl sulfate, zirconium chloride, zirconyl chloride, zirconium nitrate and zirconyl nitrate are usable.

The amount of aluminum compound added is 0.01 to 50.00 wt % (calculated as Al) based on the $BaO \cdot 4.5Fe_2O_3$ particles. If the amount is less than 0.01 wt %, the dispersibility in the binder resin is insufficient. On the other hand, if the amount exceeds 50.00 wt %, it is unfavorable because the hydroxide fine particles and the like of aluminum floating outside the surfaces of the particles interact. The amount of aluminum compound coating the $BaO \cdot 4.5Fe_2O_3$ particles is preferably 0.05 to 10.0 wt % (calculated as Al) based on the $BaO \cdot 4.5Fe_2O_3$ particles.

The amount of silica compound added is 0.01 to 50.00 wt % (calculated as $SiO_2$) based on the $BaO \cdot 4.5Fe_2O_3$ particles. If the amount is less than 0.01 wt %, the dispersibility in the binder resin is insufficient. On the other hand, if the amount exceeds 50.00 wt %, it is unfavorable because the hydroxide fine particles and the like of silicon floating outside the surfaces of the particles interact. The amount of silica compound coating the $BaO \cdot 4.5Fe_2O_3$ particles is preferably 0.05 to 10.0 wt % (calculated as $SiO_2$) based on the $BaO \cdot 4.5Fe_2O_3$ particles.

The amount of zinc compound added is 0.01 to 50.00 wt % (calculated as Zn) based on the $BaO \cdot 4.5Fe_2O_3$ particles. If the amount is less than 0.01 wt %, the dispersibility in the binder resin is insufficient. On the other hand, if the amount exceeds 50.00 wt %, it is unfavorable because the hydroxide fine particles and the like of zinc floating outside the surfaces of the particles interact. The amount of zinc compound coating the $BaO \cdot 4.5Fe_2O_3$ particles is preferably 0.05 to 10.0 wt % (calculated as Zn) based on the $BaO \cdot 4.5Fe_2O_3$ particles.

The amount of zirconium compound added is 0.01 to 50.00 wt % (calculated as Zr) based on the $BaO \cdot 4.5Fe_2O_3$ particles. If the amount is less than 0.01 wt %, the dispersibility in the binder resin is insufficient. On the other hand, if the amount exceeds 50.00 wt %, it is unfavorable because the hydroxide fine particles and the like of zirconium floating outside the surfaces of the particles interact. The amount of zirconium compound coating the $BaO \cdot 4.5Fe_2O_3$ particles is preferably 0.05 to 10.0 wt % (calculated as Zr) based on the $BaO \cdot 4.5Fe_2O_3$ particles.

When a mixture of at least two selected from the group consisting of aluminum compound, silica compound, zinc compound and zirconium compound is used, the amount of mixture added is 0.01 to 50.00 wt % (calculated as Al, $SiO_2$, Zn and Zr) based on the $BaO \cdot 4.5Fe_2O_3$ particles. The amount of mixture coating the $BaO \cdot 4.5Fe_2O_3$ particles is preferably 0.05 to 10.0 wt % (calculated as Al, $SiO_2$, Zn and Zr) based on the $BaO \cdot 4.5Fe_2O_3$ particles.

The surface treatment of the $BaO \cdot 4.5Fe_2O_3$ particles with a coupling agent is conducted by, for example, (i) a dry process of charging the $BaO \cdot 4.5Fe_2O_3$ particles into a mixer such as a Henschel mixer and an edge runner mill, adding a predetermined amount of coupling agent, and mixing them; and (ii) a wet process of adding a coupling agent, in the form of an emulsion, an alcoholic solution or as it is when the coupling agent is water-soluble, to an aqueous suspension containing the $BaO \cdot 4.5Fe_2O_3$ particles, heating and aging, if necessary, so as to coat the surfaces of the particles with the dehydrated condensate of the coupling agent, filtering, washing with water, drying and pulverizing the coated particles.

As the coupling agent, silane coupling agents, titanate coupling agents, aluminate coupling agents and zirconate coupling agents are usable.

Examples of the titanate coupling agents are water-soluble coupling agents such as triethanolamine titanate chelate, lactic acid titanate chelate and isopropyltri (N-aminoethyl·aminoethyl) titanate; and coupling agents which are soluble to an organic solvent as a liquid dispersion medium, such as isopropyltristearoyl titanate, isopropyltris (dioctylpyrophosphate) titanate, isopropyltri(N-aminoethyl·aminoethyl) titanate, tetraoctylbis(ditridecyl phosphate) titanate, tetra(2-2-diallyloxymethyl-1-butyl)bis (ditridecyl) phosphate titanate, bis(dioctylpyrophosphate) oxyacetate titanate and bis(dioctylpyrophosphate) ethylenetitanate.

Examples of the silane coupling agents are vinyltriethoxysilane, vinyltrimethoxysilane, vinyltrichlorosilane, vinyltris(β methoxyethoxy)silane, γ-(methacryloxypropyl)trimethoxysilane, γ-aminopropyltrimethoxysilane, N-B-(aminoethyl)γ-aminopropyltrimethoxysilane, β-(3,4 epoxycyclohexyl) ethyltrimethoxysilane, γ-glycidoxypropyltrimethoxysilane and γ-mercaptopropyltrimethoxysilane, which are soluble to an organic solvent as a liquid dispersion medium.

Examples of the aluminate coupling agents are acetoalkoxyaluminum diisopropylate, aluminum diisopropoxymonoethyl acetoacetate, aluminum trisethyl acetoacetate and aluminum trisacetylacetonate, which are soluble to an organic solvent as a liquid dispersion medium.

Examples of the zirconate coupling agents are zirconium tetrakis acetylacetonate, zirconium dibuthoxybis acetylacetonate, zirconium tetrakisethyl acetoacetate, zirconium tributhoxymonoethyl acetoacetate and zirconium tributhoxy acetylacetonate, which are soluble to an organic solvent as a liquid dispersion medium.

The amount of dehydrate condensate of the coupling agent which is coated on the $BaO \cdot 4.5Fe_2O_3$ particles, is 0.01 to 20.0 wt %, preferably 0.05 to 10.0 wt % (calculated as C) based on the $BaO \cdot 4.5Fe_2O_3$ particles.

The surface-treated $BaO \cdot 4.5Fe_2O_3$ particles in the present invention are non-magnetic particles having an average particle diameter of not more than 0.1 μm, preferably 0.005 to 0.05 μm, more preferably 0.01 to 0.04 μm.

The mechanochemical treatment of the $BaO \cdot 4.5Fe_2O_3$ particles which is ordinarily conducted for the purpose of improving the dispersibility of the particles in a vehicle can increase the packing amount of the particles in the undercoating layer, which leads to the enhancement of the vibration proofness.

The granular $BaO \cdot 4.5Fe_2O_3$ particles with an oxide or a hydroxide containing Al, Si or both Al and Si adhered (coated) to the surfaces thereof used in the present invention are produced by (i) steps of adding an aqueous alkali solution to an aqueous suspension containing the $BaO \cdot 4.5Fe_2O_3$ particles which are produced by the above-mentioned process to obtain a suspension having a pH of to not less than 10, adding an aqueous solution containing Al, Si or both Al and Si to the resultant suspension, adjusting the pH of the resultant suspension to approximately the neutrality under stirring so as to quickly precipitate an oxide or hydroxide containing Al, Si or both Al and Si, filtering out the obtained particles with said oxide or hydroxide deposited and/or precipitated on the surface or periphery thereof, washing with water and drying the obtained solid substance, and compacting and pulverizing the solid substance by an edge runner mill so as to adhere an oxide or hydroxide containing Al and/or Si to the surface of the $BaO \cdot 4.5Fe_2O_3$ particles; or (ii) steps of repeating the above-mentioned steps taken from said step of adding an aqueous alkali solution to an aqueous suspension containing $BaO \cdot 4.5Fe_2O_3$ particles to obtain a suspension having a pH of not less than 10 to the step of compacting and pulverizing the solid substance by an edge runner mill at least twice to adhere an oxide or hydroxide containing Al and/or Si to the surface of the $BaO \cdot 4.5Fe_2O_3$ particles.

In the above-mentioned process, after adding an aqueous alkali solution to the aqueous suspension containing the $BaO \cdot 4.5Fe_2O_3$ particles to obtain the suspension having a pH to not less than 10, by adding an aqueous solution containing Al, Si or both Al and Si to the resultant suspension, the $BaO \cdot 4.5Fe_2O_3$ particles can be sufficiently and uniformly mixed in the aqueous suspension because of the electric repulsion of the particles therein.

As the aqueous alkali solution for adjusting the pH of the suspension to not less than 10, aqueous solutions of sodium hydroxide, potassium hydroxide, ammonia water, etc. are usable.

As the aqueous solution containing Al, an aqueous solution of an alkali aluminate such as sodium aluminate and potassium aluminate, and an aqueous solution of an aluminum salt such as aluminum sulfate, aluminum chloride and aluminum nitrate are usable.

The amount of Al compound added is 0.01 to 20.0 wt % (calculated as Al) based on the $BaO \cdot 4.5Fe_2O_3$ particles. With due consideration for the dispersibility of the target particles, the amount of Al compound added is preferably 0.05 to 10.0 wt % (calculated as Al) based on the $BaO \cdot 4.5Fe_2O_3$ particles.

As the aqueous solution containing Si, aqueous solutions of sodium silicate, potassium silicate, colloidal silica, water glass #3 and the like are usable.

The amount of Si compound added is 0.01 to 20.0 wt % (calculated as $SiO_2$) based on the $BaO \cdot 4.5Fe_2O_3$ particles. With due consideration for the dispersibility of the target particles, the amount of Si compound added is preferably 0.05 to 10.0 wt % (calculated as $SiO_2$) based on the $BaO \cdot 4.5Fe_2O_3$ particles.

When a mixture of an aqueous solution containing Al and an aqueous solution containing Si is added to the suspension in the present invention, the amount of mixed solution added is 0.01 to 20.0 wt %, preferably 0.05 to 10.0 wt % (calculated as the total amount of Al and $SiO_2$) based on the $BaO \cdot 4.5Fe_2O_3$ particles.

If the steps taken from the addition of an aqueous alkali solution to an aqueous suspension containing the $BaO \cdot 4.5Fe_2O_3$ particles so as to adjust the pH of the suspension to not less than 10 to the compaction and pulverization of the solid substances composed of the $BaO \cdot 4.5Fe_2O_3$ particles by an edge runner mill which will be described later are repeated at least twice, the amount of Al compound and/or Si compound added each time is determined with due consideration for the sum of the above-described amount of each compound. It is preferably 0.05 to 10.0 wt %.

In the present invention, an aqueous solution of the Al compound and/or the Si compound is added to the suspension containing the $BaO \cdot 4.5Fe_2O_3$ particles having a pH of not less than 10, and the pH of the resultant suspension is rapidly adjusted to approximately the neutrality (6.5 to 8.5) under stirring so as to quickly precipitate substantially the total amount of Al and/or Si as an oxide or hydroxide thereof and produce a solid substance of the $BaO \cdot 4.5Fe_2O_3$ particles with an oxide or hydroxide thereof.

The time for adjusting the pH of the suspension for precipitating an oxide or hydroxide containing each element is in the range of 1 to 10 minutes. If the time exceeds 10 minutes, the oxide or hydroxide of Al and/or Si is sometimes precipitated on the surfaces of the $BaO \cdot 4.5Fe_2O_3$ particles in layers. Therefore, after the precipitation of the oxide or hydroxide, the solid substance composed of the particles with the oxide or hydroxide are promptly filtered out under the ordinary conditions. The time may be less than 10 minute but it takes at least about 1 minute to precipitate Al and/or Si as an oxide or hydroxide.

As the acid for adjusting the pH of the suspension, sulfuric acid, hydrochloric acid, acetic acid, nitric acid, carbon dioxide gas, etc. are usable.

In order to enhance the strength and the durability of the non-magnetic undercoating layer for a magnetic recording medium while reducing the amount of solvent remaining in the undercoating layer after the coating film is dried, it is preferable to add a compound of one selected from the group consisting of Zn, Co, Ni, V, Mg, Ca, Sr, Ba, Bi and P in addition to the Al compound and/or the Si compound. In order to enhance the mechanical strength (scratch resistance) and the running durability while reducing the friction coefficient, it is preferable to add a compound of one selected from the group consisting of Zr, Ti, Hf and Mo in addition to the Al compound and/or the Si compound. In order to enhance the surface smoothness and the electrification property while reducing the surface resistance, it is preferable to add a compound of one selected from the group consisting of Sn, Sb, Ag, Pd, Cu and Fe in addition to the Al compound and/or the Si compound. Each of these compounds may be used in the form of a water-soluble salt such as sulfate, chloride and nitrate of each element.

These compounds may be appropriately combined with each other in accordance with the object of addition and the nature of each element, and the amount of compound added is 0.01 to 20.0 wt % (calculated as each element) based on the $BaO \cdot 4.5Fe_2O_3$ particles. With due consideration for the dispersibility of the target particles, the amount of each compound added is preferably 0.05 to 10.0 wt %.

Among the above-described elements, Ca, Sr and Ba sometimes elute when substantially the total amount of precipitated oxide or hydroxide particles thereof are washed. To prevent this, they are preferably subjected to the following treatments. When a Ca compound is used and the suspension containing the Ca compound is neutralized with the above-described acid other than carbon dioxide, after the pH of the suspension is adjusted, a slight amount of carbon dioxide gas is blown into the suspension so as to bubble it. By this treatment, Ca ions are combined with carbon dioxide as $CaCO_3$, so that Ca is unlikely to elute. The same treatment may be adopted when an Sr compound is used so that Sr ions are combined with carbon dioxide as $SrCO_3$ and Sr is unlikely to elute. When a Ba compound is used, the suspension containing the Ba compound is preferably neutralized with sulfuric acid. When an acid other than sulfuric acid is used as the neutralizer, it is preferable to add sulfuric acid after the adjustment of the pH so as to combine Ba ions therewith as $BaSO_4$, whereby Ba ions are unlikely to elute.

The solid substances composed of the $BaO \cdot 4.5Fe_2O_3$ particles and the oxide or hydroxide is filtered out, washed with water and dried by an ordinary method. Since the solid substances exists by the interaction thereof, filtration, washing with water and drying of the mixture may be conducted by an ordinary method without particularly deteriorating the operability.

As the edge runner mill used for the compaction and pulverization of the solid substance in the present invention, "Sand Mill" manufactured by Kabushiki Kaisha Matsumoto Chuzo Tekkosho and "Mix Muller" manufactured by Shinto Industry Co., Ltd., etc. are usable.

The line load of the edge runner mill is 15 to 80 kg/cm, preferably 30 to 60 kg/cm. If the line load is less than 15 kg/cm, since the shearing force during grinding is too weak, it is impossible to exert the mechanochemical effect. On the other hand, if the line load exceeds 80 kg/cm, there is a fear of the particles themselves being broken. The treating time is 15 to 120 minutes, preferably 30 to 60 minutes.

In the present invention, the steps taken from the adding step of an aqueous alkali solution to an aqueous suspension containing the $BaO \cdot 4.5Fe_2O_3$ particles to obtain a suspension having a pH of not less than 10 to the compaction and pulverization step of the solid substances of the $BaO \cdot 4.5Fe_2O_3$ particles with the oxide or hydroxide by an edge runner mill may be repeated twice or more, preferably two to five times. Although the advantages aimed at in the present invention are obtained even if the steps are repeated more than five times, approximately full advantages are achieved so that repeating the steps more is not industrially expedient.

As the binder resin in the present invention, the following resins which are at present generally used for the production of a magnetic recording medium are usable. For example, vinyl chloride-vinyl acetate copolymer, urethane resin, vinyl chloride-vinyl acetate urethane-maleate elastomer, butadiene-acrylonitrile copolymer, polyvinyl butyral, cellulose derivative such as nitrocellulose, polyester, synthetic rubber resin such as polybutadiene, epoxy resin, polyamide, polyisocyanate, electron radiation curing acryl urethane resin and mixtures thereof may be exemplified. Each of these resin binders may contain a polar group such as —OH, —COOH, —$SO_3M$, $OPO_2M_2$ and —$NH_2$, wherein M represents H, Na or K.

A non-magnetic undercoating layer for a magnetic recording medium according to the present invention is obtained by forming a coating film by coating the surface of a non-magnetic substrate with a coating film composition composed of the coated acicular or spindle-shaped $\alpha$-$Fe_2O_3$ particles, the BaO·4.5$Fe_2O_3$ particles, the coated BaO·4.5$Fe_2O_3$ particles and/or the surface-treated BaO·4.5$Fe_2O_3$ particles of the present invention and a binder resin.

It is possible to add a lubricant, a polishing agent, an antistatic agent, etc. which are generally used for the production of a magnetic recording medium to the non-magnetic undercoating layer.

As the non-magnetic substrate, the following materials which are at present generally used for the production of a magnetic recording medium are usable. For example, a synthetic resin film such as polyethylene terephthalate, polyethylene, polypropylene, polycarbonate, polyethylene naphthalate, polyamide, polyamideimide and polyimide, film foil and plate of a metal such as aluminum and stainless steel, and various kinds of paper may be exemplified.

The thickness of the undercoating layer obtained by coating a non-magnetic substrate with a coating film composition and drying the coating composition is 1 to 10 $\mu$m. If the thickness is less than 1 $\mu$m, not only it is impossible to improve the surface roughness of the base film but also the strength is insufficient. Even if the thickness exceeds 10 $\mu$m, the desired properties are obtained, but in order to obtain a thin magnetic recording medium, it is preferable to form to produce an undercoating layer of not more than 10 $\mu$m in thickness. The preferred thickness is 2 to 4 $\mu$m.

A magnetic recording medium of the present invention is obtained by forming a magnetic recording layer on the non-magnetic undercoating layer for a magnetic recording medium according to the present invention by coating the non-magnetic undercoating layer with a coating film composition containing magnetic particles and a binder resin.

It is possible to add to the magnetic layer, a lubricant, a polishing agent, an antistatic agent, etc. which are generally used for the production of a magnetic recording medium.

As the magnetic particles in the magnetic recording layer are usable magnetic iron oxide particles such as maghemite particles, magnetite particles, berthollide particles as an intermediate oxide of maghemite and magnetite; magnetic iron oxide particles containing elements other than Fe such as Co, Al, Ni, P, Zn, Si and B; magnetic iron oxide particles coated with Co or the like; magnetic metal particles containing iron as the main ingredient; magnetic iron-based alloy particles containing elements other than iron such as Co, Al, Ni, P, Zn, Si, B or the like; plate-like Ba ferrite particles and plate-like composite ferrite particles containing divalent metal such as Co, Ni and Zn and a quadrivalent metal such as Ti, Sn and Zr as coercive force reducing agents. The shape of the magnetic particles is not specified and, for example, acicular or spindle-shaped, spindle-shaped, cubic and plate-like particles are usable.

As the binder resin in the magnetic recording layer, the same resin as that used in the formation of the undercoating layer may be used.

The non-magnetic undercoating layer for a magnetic recording medium according to the present invention is excellent in the surface smoothness and the strength, so that it is possible to obtain a thin magnetic recording layer having a small light transmittance, an excellent surface smoothness, a uniform thickness and a high strength when a magnetic recording medium is produced by coating the surface of the non-magnetic undercoating layer with a coating film composition containing magnetic particles and a binder resin.

The reason why the non-magnetic undercoating layer for a magnetic recording medium according to the present invention is excellent in the surface smoothness and the strength is as follows.

It is possible to orient the acicular or spindle-shaped particles at the time of coating the surface of a non-magnetic substrate, and the oriented acicular or spindle-shaped particles make the light transmittance of the coating layer small and enhance the surface smoothness and the strength thereof, as described on page 339 of *Materials for Synthetic Technology*, " . . . Pigment particles such as acicular or spindle-shaped $\gamma$-$Fe_2O_3$ particles which are regarded as rod-like particles are oriented in parallel to the surface of a substrate when the surface is coated with the pigment particles in such a manner that a shearing force is applied thereto . . . . The rod-like particles which are oriented parallel to the surface of the substrate have larger obliterating power and gloss and smaller light or gas transmittance than rod-like particles which are oriented vertical to the surface of the substrate. The difference in the orientation of the pigment particles also influences the mechanical properties of the coating film. That is, the closer to the horizontal orientation to the surface of the substrate, the higher the strength is and the smaller the elongation is. . . . "

However, the dispersibility of the particles is a problem, as described on page 343 of *Materials for Synthetic Technology*, " . . . If the dispersibility of the magnetic particles is poor, not only is the surface smoothness deteriorated but also the orientation is influenced so that the magnetic characteristics are deteriorated. . . . "

As a result of investigations of various non-magnetic particles which can enhance the surface smoothness and the strength, it is considered by the present inventors that by using of the same iron oxide particles as the magnetic particles used in the magnetic recording layer as the non-magnetic particles for the undercoating layer for a magnetic recording medium, the conformity with a binder resin is enhanced when the base film is coated therewith, and that the adhesiveness and the durability are also increased. For this reason, acicular or spindle-shaped $\alpha$-$Fe_2O_3$ particles are selected as the non-magnetic particles.

However, since it is impossible to obtain a sufficient orientation, an excellent surface smoothness or an adequate strength by coating the base film with a composition obtained only by dispersing acicular or spindle-shaped $\alpha$-$Fe_2O_3$ particles in a resin binder, various studies have been undertaken in order to make acicular or spindle-shaped $\alpha$-$Fe_2O_3$ particles easy to disperse in the binder resin.

Regarding the dispersibility of the particles, the parameter α in the α-$Fe_2O_3$ particles coated with an Al compound and/or an Si compound in accordance with the method described in Japanese Patent Application Laid-Open (KOKAI) No. 5-182177 (1993) is as low as 0.40 to 0.45, as described above. The present inventors consider that as described in the specification thereof, " . . . The surface-treated layer is generally preferably uniform and dense, although it may be porous depending upon the usage . . . ", since the oxide or hydroxide of the Si compound and/or the Al compound is precipitated in a comparatively long time so as to uniformly and densely coat the surfaces of the particles, so that the particle surfaces have few polymer adsorption sites, the dispersibility of the particles when dispersed in a resin is insufficient.

As a method of coating the surfaces of oxide iron particles, a method of uniformly coating the surfaces with a precipitate in a considerably long time is generally adopted, as described in Japanese Patent Publication (KOKOKU) No. 54-7292 (1979), " . . . gradually added. After addition, the resultant mixture was further stirred for 30 minutes . . . ", and in Japanese Patent Application Laid-Open (KOKAI) Nos. 51-47923 (1976) and 51-66320 (1976), " . . . after neutralization, the resultant solution was stirred for one hour . . . ."

The present inventors investigated a method of increasing the thickness of a polymer adsorption layer by increasing the number of polymer adsorption sites on the surfaces of the acicular or spindle-shaped α-$Fe_2O_3$ particles as much as possible.

The present inventors considered that it is necessary to chemically adsorb as large an amount of ultra-fine particles of an oxide or a hydroxide of Al or Si or both Al and Si as possible on the surfaces of the acicular or spindle-shaped α-$Fe_2O_3$ particles. It was possible to densely adhere the ultra-fine particles of an oxide or a hydroxide of Al or Si or both Al and Si on the surfaces of the acicular or spindle-shaped α-$Fe_2O_3$ particles due to the mechanochemical effect produced by uniformly precipitating the ultra-fine particles of an oxide or a hydroxide of Al or Si or both Al and Si in the suspension containing the acicular or spindle-shaped α-$Fe_2O_3$ particles, uniformly mixing the ultra-fine particles with the acicular or spindle-shaped α-$Fe_2O_3$ particles, and compacting the solid substances. As a result, the parameter α in the α-$Fe_2O_3$ particles increased to not less than 0.50, preferably 0.50 to 0.70. It is considered due to the increase in the polymer adsorption sites on the particle surfaces.

It has, also, been found that when an oxide or hydroxide of Al or Si or both Al and Si is adhered to the acicular or spindle-shaped α-$Fe_2O_3$ particles, the conformity with a binder resin is greatly enhanced and the dispersibility of the particles in the coating film composition composed of the acicular or spindle-shaped α-$Fe_2O_3$ particles coated with the Al compound and/or Si compound and the binder resin is excellent, and that when the coating film composition is applied to a base film, the mechanical orientation on the base film is smoothly conducted, so that the non-magnetic undercoating layer for a magnetic recording medium obtained has an excellent surface smoothness and a high strength.

As a result of further studies, it has been found that when the average major axial diameter of the coated (mechanochemical-treated) acicular or spindle-shaped α-$Fe_2O_3$ particles is 0.05 to 0.25 μm, the minor axial diameter thereof is 0.010 to 0.035 μm, the particle size distribution thereof in geometrical standard deviation is not more than 1.40, and the aspect ratio thereof is 2 to 20, the non-magnetic undercoating layer for a magnetic recording medium has a more excellent surface smoothness and a higher strength.

This is considered to be because by adhering an oxide or hydroxide of Al or Si or both Al and Si to the surfaces of the acicular or spindle-shaped α-$Fe_2O_3$ particles, the conformity of the particles with the binder resin is improved and the dispersibility is thereby improved.

Although Japanese Patent Application Laid-Open (KOKAI) No. 62-295217 (1987) discloses a magnetic recording medium with a magnetic layer containing α-$Fe_2O_3$ particles coated with a compound containing at least one selected from the group consisting of Si, Cr and Al, in this case, not only the enhancement of the recording density is impaired but also the reduction in the thickness of the magnetic layer becomes difficult similar to the case of adding non-magnetic carbon black. Therefore, the magnetization depth from the surface of the magnetic tape is reduced and the reduction in the thickness of the magnetic tape is conducted insufficiently, as described above.

On the other hand, the non-magnetic undercoating layer for a magnetic recording medium, containing granular BaO·4.5$Fe_2O_3$ particles, for example, granular BaO·4.5$Fe_2O_3$ fine-particles, surface-treated granular BaO·4.5$Fe_2O_3$ fine-particles and coated (mechanochemical-treated) granular BaO·4.5$Fe_2O_3$ fine-particles used in the present invention shows the surface smoothness and the strength, and has vibration proofness. It is, therefore, possible to produce a thin magnetic recording layer having an excellent surface smoothness and a uniform thickness by applying a coating film composition containing magnetic particles and a binder to the surface of the non-magnetic undercoating layer so as to produce a magnetic recording medium, and the magnetic tape obtained has an excellent strength and vibration proofness due to the non-magnetic undercoating layer having a high strength and vibration proofness. As a result, the parameter α in the granular BaO·4.5$Fe_2O_3$ particles increased to not less than 0.50, preferably 0.50 to 0.70. It is considered due to the increase in the polymer adsorption sites on the particle surfaces.

The reason why the magnetic recording medium having a non-magnetic undercoating layer of the present invention has vibration proofness, is considered by the present inventors as follows. BaO·4.5$Fe_2O_3$ particles are granular fine particles having an average particle diameter of not more than 0.1 μm and a uniform particle size. In addition, since the compressed density of the BaO·4.5$Fe_2O_3$ particles is 2.0 to 3.0 g/$cm^3$, preferably about 2.38 g/$cm^3$, which is larger than the compaction density 1.78 g/$cm^3$ of titanium oxide which is typical of the non-magnetic particles for an undercoating layer, the packing property of the BaO·4.5$Fe_2O_3$ particles is good, so that the packing amount of the particles in the non-magnetic undercoating layer is larger than that of other non-magnetic particles.

In the non-magnetic undercoating layer containing the coated acicular or spindle-shaped α-$Fe_2O_3$ particles of the present invention, the gloss (at 45°) is not less than 170%, preferably not less than 175%, the surface roughness (Ra) is not more than 16 nm, preferably not more than 14 nm, and the Young's modulus (relative value) is not less than 100, preferably not less than 110.

In the non-magnetic undercoating layer containing the BaO·4.5$Fe_2O_3$ particles of the present invention, the gloss (at 45°) is not less than 138%, preferably not less than 140%, the surface roughness (Ra) is not more than 19 nm, preferably not more than 18 nm, and the Young's modulus (relative value) is not less than 90, preferably not less than 100.

The magnetic recording medium (magnetic tape) using as magnetic particles the magnetic metal particles of the present invention has a coercive force of 1400 to 2300 Oe, preferably 1500 to 2300 Oe, a squareness of not less than 0.87, preferably not less than 0.88, a gloss (at 45°) of not less than 188%, preferably not less than 195%, a surface roughness (Ra) of not more than 11 nm, preferably not more than 8 nm, and a Young's modulus (relative value) of not less than 110, preferably not less than 120.

The magnetic recording medium (magnetic tape) using as magnetic particles the Co-doped iron oxide particles of the present invention has a coercive force of 500 to 1500 Oe, preferably 600 to 1000 Oe, a squareness of not less than 0.86, preferably not less than 0.89, a gloss (at 45°) of not less than 145%, preferably not less than 150%, a surface roughness (Ra) of not more than 12.5 nm, preferably not more than 10.5 nm, and a Young's modulus (relative value) of not less than 116, preferably not less than 120.

The magnetic recording medium (magnetic tape) using as magnetic particles the Ba ferrite particles of the present invention has a coercive force of 600 to 1800 Oe, preferably 650 to 1600 Oe, a squareness of not less than 0.77, preferably not less than 0.80, a gloss (at 45°) of not less than 175%, preferably not less than 185%, and a surface roughness (Ra) of not more than 11.0 nm, preferably not more than 10 nm.

The magnetic recording medium (magnetic tape) of the present invention also has either of the following properties:

(1) the linear absorption coefficient is not less than 1.17 $\mu m^{-1}$, preferably not less than 1.20 $\mu m^{-1}$;
(2) the signal recording property (output at 10 MHz) is not less than +0.5 dB, preferably +1 to +6 dB; and
(3) the dispersion in the envelope is 0.1 to 0.5 dB, preferably 0.1 to 0.3 dB (in case of using $BaO \cdot 4.5Fe_2O_3$ particles).

Since acicular or spindle-shaped $\alpha$-$Fe_2O_3$ particles in which the parameter $\alpha$ is as large as not less than 0.50 and which has an excellent dispersibility by adhering an oxide or a hydroxide of Al, Si or both Al and Si to the surfaces of the particles are used in the non-magnetic undercoating layer for a magnetic recording medium of the present invention, as shown in later-described examples, the non-magnetic undercoating layer is excellent in the strength and the surface smoothness. When the non-magnetic undercoating layer is formed into a magnetic recording medium by applying the magnetic coating composition composed of magnetic particles and a binder resin on the surface thereof, a thin magnetic recording layer having a small light transmittance, an excellent surface smoothness and a uniform thickness is obtained.

The non-magnetic undercoating layer for a magnetic recording medium, containing the granular $BaO \cdot 4.5Fe_2O_3$ particles of the present invention is excellent in the surface smoothness and the strength and has a vibration proofness, as shown in later-described examples. When the non-magnetic undercoating layer is formed into a magnetic recording medium, it is, therefore, possible to produce a thin magnetic recording layer having an excellent surface smoothness, a uniform thickness, and a high strength and vibration proofness.

EXAMPLES

The present invention will now be described in more detail with reference to the following examples and comparative examples, but the present invention is not restricted to those examples and various modifications are possible within the scope of the invention.

The properties in the examples were measured by the following methods.

The dispersibility was evaluated by the molecular-weight-dependent parameter $\alpha$ in the formula:

$$As = K_1 \cdot M^\alpha$$

The closer the parameter $\alpha$ to 1, the more excellent the dispersibility. In the present invention, it is necessary that $\alpha \leq 0.5$.

Binder solutions of not less than three kinds, preferably 5 to 6 kinds having different resin concentrations within the range of 0.01 to 5% were obtained by adding and dissolving resin binders having different molecular weight, that is, (i) an urethane resin having a number-average molecular weight of 15,000 and having sulfonate group, (ii) an urethane resin having a number-average molecular weight of 28,000 and having sulfonate group, and (iii) an urethane resin having a number-average molecular weight of 42,000 and having sulfonate group into a mixed solvent of methyl ethyl ketone, toluene and cyclohexane (weight ratio: 5:3:2), respectively.

A resin concentration of each binder solution prepared was measured by a weight method and was assumed to be an initial resin concentration Ci.

To 56 g of each binder resin prepared, 20 g of nonmagnetic particles were added and resultant solution was uniformly dispersed to form a nonmagnetic coating composition until an adsorbed resin concentration on the surface of the nonmagnetic particles and a resin concentration in the binder solution were attained to equilibrium. The obtained nonmagnetic coating composition was subjected to centrifugal separation at a rate of 10,000 rpm for 25 minutes by using a centrifugal separator (manufactured by Kokusan Enshinki Kabushiki Kaisha). After attaining equilibrium state between a supernatant liquid and a precipitated substance, the precipitated substance was removed therefrom and an equilibrated binder concentration C of the obtained supernatant liquid was determined by a weight method.

The difference obtained by subtracting the binder concentration C of the supernatant liquid from the initial resin concentration Ci is assumed to be an apparent resin-adsorption amount A of the nonmagnetic particles.

The binder concentration C and the apparent resin-adsorption amount A of the each binder solution having different concentration were measured by the same method described above.

The obtained values were plotted in a graph of an ordinate of the ratio (C/A) of the binder concentration C to the apparent resin adsorption amount A and an abscissa of the binder concentration C, thereby obtaining a linear relationship therebetween.

The inclination of the obtained straight-line in the graph corresponds to 1/As in the following Langmuir induction formula.

$$C/A = (1/As) \times C + (1/As \cdot K_2)$$

C: Equilibrated binder concentration of the supernatant liquid
A: Apparent resin-adsorption amount
As: Saturation adsorption amount
$K_2$: Constant Accordingly, the saturation adsorption amount As was obtained from the above-mentioned Langmuir induction formula.

The saturation adsorption amount As and the molecular weight M of the binder were plotted in a log—log table so as to obtain the linear relationship between As and M. The molecular weight-dependent parameter α was obtained from the inclination of the straight line.

The average major axial diameter, the average minor axial diameter and the aspect ratio of the particles in each of the following examples and comparative examples are expressed by the average values measured in electron microphotographs.

The particle size distribution of the particles is expressed by the geometrical standard deviation (σg) obtained by the following method. The major axial diameters of 350 particles in an electron microphotograph (×120,000 magnification) were measured. The actual major axial diameters and the number of the particles were obtained from the calculation on the basis of the measured values. In logarithmico-normal probability paper, the major axial diameters were plotted at regular intervals on the abscissa-axis and the accumulative number of particles belonging to each interval of the major axial diameters was plotted by percentage on the ordinate-axis by a statistical technique. The major axial diameters corresponding to the number of particles of 50% and 84.13%, respectively, were read from the graph, and the geometrical standard deviation (σg) was measured from the following formula:

Geometrical standard deviation (σg)=major axial diameter ($\mu$m) corresponding to the number of particles of 50%/major axial diameter ($\mu$m) corresponding to the number of particles of 84.13%

The specific surface area is expressed by the value measured by a BET method.

The amount of each element of the compound of such as Al, Si, Zn, Mg, P, Zr, Ti and Sb with which the acicular or spindle-shaped α-$Fe_2O_3$ particles are coated was measured from fluorescent X-ray analysis.

The dispersibility was evaluated by the parameter α. Binders having different molecular weights (M=15000, 28000, 42000) were used, and the parameter α was obtained by measuring the saturation adsorption (As) particles to each of the binders. The (As)s and (M)s are plotted in the respective logarithm tables so as to obtain a linear relationship. The parameter α was obtained from the inclination of the line.

The gloss of the coating film was obtained by measuring the gloss at 45° by "Glossmeter UGV-5D, produced by Shimazu Seisakusho Ltd.

The surface roughness (Ra) is expressed by the average value of the center-line average roughness of the coating film by using "Surfcom-575A", manufactured by Tokyo Seimitsu Co., Ltd.

The strength of the coating film was obtained by measuring the Young's modulus by using "Autograph", manufactured by Shimazu Seisakusho Ltd.

The magnetic characteristics were measured by using "Vibration Sample Magnetometer VSM-3S-15", manufactured by Toei Kogyo Co., Ltd. and applying an external magnetic field up to 10 kOe.

The light transmittance of a magnetic sheet is expressed by the linear adsorption coefficient measured by using "Photoelectric Spectrophotometer UV-2100", manufactured by Shimazu Seisakusho Ltd. The linear adsorption coefficient is defined by the following formula, and the larger the value, the more difficult it is for the magnetic sheet to transmit light:

Linear adsorption coefficient ($\mu m^{-1}$)=1n(l/t)/FT wherein t: light transmittance at λ=900 nm, and FT: thickness ($\mu$m) of the coating film the film used for the measurement.

If the linear adsorption coefficient is not less than 1.2 (film thickness: 4.0 $\mu$m), it satisfies the light transmittance of not more than 0.8% determined by the VHS standard.

The amount of dehydrated condensate of a coupling agent is expressed by the C content measured by "Carbon/Sulfur Analyser EMIA-2200" (manufactured by Kabushiki Kaisha Horiba Seisakusho).

The vibration proofness is expressed by the dispersion in the envelope.

The signal recording property is expressed by a relative value. The magnetic tape produced was slit into a width of ½ inch and mounted on Drum Tester BX-3168 (manufactured by BELDEX Co., Ltd.). The signal recording output at a frequency of 10 MHz at a relative speed of the magnetic tape and the head of 5.8 m/s is expressed by a relative value on the basis of the output of a magnetic tape having the undercoating layer using known non-magnetic particles as a reference tape.

The output waveform of the signal recording property immediately after the start of measurement was displayed by the attached oscilloscope. The vibration width of the luminescent line was read and this value is expressed as the dispersion in the envelope due to sliding between the magnetic head and the magnetic tape.

The compressed density is expressed by weight (g). A sample (10 g) was charged into a cylinder having a diameter of 1 inch, and a pressure of 1 ton/$cm^2$ was applied to the sample. The volume of the compacted sample was obtained and the compaction density is expressed by the weight (g) per $cm^3$.

Production of coated acicular α-$Fe_2O_3$

Examples 1 to 8

Comparative Examples 1 to 7

Example 1

10 kg of acicular α-FeOOH particles (average major axial diameter: 0.20 $\mu$m, average minor axial diameter: 0.019 $\mu$m, aspect ratio: 10.5, BET specific surface area: 134.4 $m^2$/g) were charged into an one end open-type retort, and heated at a temperature of 500° C. for 75 minutes in air and dehydrated while the container was rotated. The particles were further annealed at a temperature of 630° C. for 100 minutes, thereby obtaining acicular α-$Fe_2O_3$ particles.

The thus-obtained acicular α-$Fe_2O_3$ particles had an average major axial diameter of 0.13 $\mu$m, an average minor axial diameter of 0.023 $\mu$m and an aspect ratio of 5.7.

The acicular α-$Fe_2O_3$ particles were then stirred and mixed in water and then pulverized in a wet process by a line mill-type pulverizer (Homomic Line Mill, manufactured by Tokushuki Kogyo Co., Ltd.), thereby obtaining a suspension containing the acicular α-$Fe_2O_3$ particles.

While the suspension was stirred, an aqueous NaOH solution of 0.1 mol/liter was added to adjust the pH to 10.5. After the mixed suspension was stirred and mixed, 6667 ml (equivalent to 3.00 wt % (calculated as Al) based on the α-$Fe_2O_3$ particles) of an aqueous sodium aluminate of 1.0 mol/liter was added to the suspension, and the mixed suspension was stirred. While stirring the mixed suspension, an aqueous solution of HCl of 1.0 mol/liter was added so as to adjust the pH to 7.1. The time taken for the adjustment was 5 minutes. The precipitate was immediately filtered out, washed with water and dried by an ordinary method to obtain acicular α-$Fe_2O_3$ particles.

5 kg of the thus-obtained acicular α-$Fe_2O_3$ particles were charged into an edge runner mill "MPUV-Model 2"

(Manufactured by Kabushiki Kaisha Matsumoto Chuzo Tekkosho), and compacted and pulverized for 60 minutes at a line load of 60 kg/cm.

The amount of Al adhered to the acicular $\alpha$-$Fe_2O_3$ particles was 2.99 wt %, and the parameter $\alpha$ was 0.55.

After 4.5 kg of the acicular $\alpha$-$Fe_2O_3$ particles obtained were mixed with water and stirred again, an aqueous NaOH solution of 0.1 mol/liter was added to adjust the pH to 11.0. Thereafter, 311.4 g (equivalent to 2.00 wt % of the $\alpha$-$Fe_2O_3$ particles calculated as $SiO_2$) of a water glass #3 solution was added to the solution, and the mixed suspension was stirred. While stirring the mixed suspension, an aqueous solution of HCl of 1.0 mol/liter was added so as to adjust the pH to 7.5. The time taken for the adjustment was 4 minutes. The precipitate was immediately filtered out, washed with water and dried by an ordinary method to obtain acicular $\alpha$-$Fe_2O_3$ particles.

4 kg of the thus-obtained acicular $\alpha$-$Fe_2O_3$ particles were charged into an edge runner mill "MPUV-Model 2" (manufactured by Kabushiki Kaisha Matsumoto Chuzo Tekkosho), and compacted and pulverized for 30 minutes at a line load of 60 kg/cm.

The average major axial diameter of the thus-obtained acicular $\alpha$-$Fe_2O_3$ particles with the Al compound and the Si compound adhered thereto was 0.13 $\mu$m, the average minor axial diameter thereof was 0.023 $\mu$m, the aspect ratio was 5.7, the particle size distribution in geometrical standard deviation was 1.36, and the BET specific surface area was 59.8 $m^2$/g. The pH of the powder was 7.8, and the parameter $\alpha$ was 0.58.

Examples 2 to 8 and Comparative Examples 1 to 7

Acicular $\alpha$-$Fe_2O_3$ particles with Al, Si or another compound adhered thereto were produced in the same manner as in Example 1 except for varying the kind of particles to be treated, the temperature and the time for dehydration, the temperature and the time for annealing, the kind and the amount of compound added, the pH of the suspension, the time for adding a solution and stirring the suspension for the purpose of adjusting the pH, the time and the linear load for compaction, the number of times of surface treatments.

In Comparative Example 6, the particles obtained were goethite particles, and in Comparative Example 7 granular $\alpha$-$Fe_2O_3$ particles were obtained by heat-treating magnetite particles.

The main producing conditions and various properties of the products are shown in Tables 1 to 4.

Production of non-magnetic undercoating layer for magnetic recording medium

Examples 9 to 16

Comparative Examples 8 to 14

Example 9

The acicular or spindle-shaped $\alpha$-$Fe_2O_3$ particles obtained in Example 1 were first mixed with a binder resin and a solvent, so that the solid content was 75 wt %, the obtained mixture was kneaded for 30 minutes by a plasticorder. Thereafter, a predetermined amount of kneaded product was taken out and charged into a glass bottle together with glass beads and a solvent. The resultant mixture was mixed and dispersed for 6 hours by a paint conditioner.

The final composition of the coating film composition obtained was as follows:

| | |
|---|---|
| Acicular $\alpha$-$Fe_2O_3$ particles | 100 parts by weight |
| Vinyl chloride-vinyl acetate copolymer having a sodium sulfonate group | 10 parts by weight |
| Polyurethane having a sodium sulfonate group | 10 parts by weight |
| Cyclohexanone | 40.9 parts by weight |
| Methyl ethyl ketone | 102.2 parts by weight |
| Toluene | 61.3 parts by weight |

The coating film composition obtained was applied to polyethylene terephthalate film having a thickness of 14 $\mu$m to a thickness of 45 $\mu$m by using an applicator, and dried to obtain a non-magnetic undercoating layer.

The non-magnetic undercoating layer obtained had a gloss of 226%, a surface roughness (Ra) of 8.8 $\mu$m and Young's modulus of 125.

Examples 10 to 16 and Comparative Examples 8 to 14

Non-magnetic undercoating layers were produced in the same manner as in Example 9 by using the acicular $\alpha$-$Fe_2O_3$ particles (acicular goethite particles in Comparative Example 6 and granular $\alpha$-$Fe_2O_3$ particles in Comparative Example 7) obtained in Examples 2 to 8 and Comparative Examples 1 to 7.

Various properties of the products are shown in Table 5.

Production of granular $BaO\cdot4.5Fe_2O_3$ particles

Examples 17 and 18

1.28 mol of $Fe(NO_3)_3$, 0.182 mol of $Ba(OH)_2\cdot8H_2O$ and 5.94 mol of NaOH were added to 1400 ml of water in an autoclave, and the obtained mixture was heated to 150° C. The temperature was maintained at 150° C. for 5 hours. The obtained product was washed with water to obtain a slurry with unnecessary salt and alkali removed therefrom. A part of the product was dried at a temperature 80° C. to obtain dried $BaO\cdot4.5Fe_2O_3$ particles.

The granular $BaO\cdot4.5Fe_2O_3$ particles obtained had an average particle diameter of 0.022 $\mu$m and a BET specific surface area of 79.8 $m^2$/g, as shown in the electron micrograph (×10000) in FIG. 1.

Example 18

4000 ml of an alkali suspension containing 1.20 mol of $FeCl_2$, 0.15 mol of $Ba(OH)_2\cdot8H_2O$, 6.0 mol of NaOH and the balance water was heated to 40° C. The temperature was maintained at 40° C. for 5 hours while blowing air into the suspension at a rate of 250 liter/hour. $Fe^{2+}$ was completely oxidized into $Fe^{3+}$. The obtained product was washed with water to obtain a slurry with unnecessary salt and alkali removed therefrom. A part of the washed product was dried at 80° C. to produce $BaO\cdot4.5Fe_2O_3$ particles.

The granular $BaO\cdot4.5Fe_2O_3$ particles obtained had an average particle diameter of 0.040 $\mu$m and a BET specific surface area of 50.1 $m^2$/g.

Surface treatment of granular $BaO\cdot4.5Fe_2O_3$ particles

Examples 19 to 38

Example 19

30 g (equivalent to 18.84 wt % as $Al_2O_3$, 3.0 wt % (calculated as Al) based on the $BaO\cdot4.5Fe_2O_3$ particles) of an aqueous sodium aluminate was added to the slurry (equivalent to 100 g as $BaO\cdot4.5Fe_2O_3$ particles) of granular $BaO\cdot4.5Fe_2O_3$ particles obtained in Example 17, and the mixed suspension was stirred. HCl was then added to the suspension so as to adjust the pH to 7.0. The obtained mixture was stirred for 30 minutes to coat the BaO·4.5Fe$_2$O$_3$ particles with the hydroxide of aluminum.

After the resultant mixture was stirred, it was filtered, washed with water and dried by an ordinary method. Thereafter, the obtained product was compacted by an edge runner mill (Sandmill: manufactured by Kabushiki Kaisha Matsumoto Chuzo Tekkosho).

The average particle diameter of the thus-obtained granular BaO·4.5Fe$_2$O$_3$ particles coated with the hydroxide of aluminum was 0.023 μm and the BET specific surface area was 79.5 m$^2$/g.

Examples 20 to 30

Surface-treated granular BaO·4.5Fe$_2$O$_3$ particles were produced in the same manner as in Example 19 except for varying the kind of BaO·4.5Fe$_2$O$_3$ particles, the kinds of aluminum compound and other compounds, the amount thereof adhered to the particles, the pH of the suspension, the kind of coupling agent, the surface-treating method and the amount of coupling agent adhered to the particles as shown in Table 6.

Various properties of the surface-treated granular BaO·4.5Fe$_2$O$_3$ particles obtained are shown in Table 6.

Production of coated granular BaO·4.5Fe$_2$O$_3$ particles

Examples 31 to 38

Example 31

The granular BaO·4.5Fe$_2$O$_3$ particles obtained in Example 17 were then stirred and mixed in water and then pulverized in a wet process by a line mill-type pulverizer (Homomic Line Mill, manufactured by Tokushuki Kogyo Co., Ltd.), thereby obtaining a suspension containing the granular BaO·4.5Fe$_2$O$_3$ particles.

While the suspension was stirred, an aqueous NaOH solution of 0.1 mol/liter was added to adjust the pH to 11.0. After the mixed suspension was stirred and mixed, 8889 ml (equivalent to 4.00 wt % (calculated as Al) based on the BaO·4.5Fe$_2$O$_3$ particles) of an aqueous sodium aluminate of 1.0 mol/liter was added to the suspension, and the mixed suspension was stirred. While stirring the mixed suspension, an aqueous solution of HCl of 1.0 mol/liter was added so as to adjust the pH to 7.0. The time taken for the adjustment was 5 minutes. The precipitate was immediately filtered out, washed with water and dried by an ordinary method to obtain granular BaO·4.5Fe$_2$O$_3$ particles.

5 kg of the thus-obtained granular BaO·4.5Fe$_2$O$_3$ particles were charged into an edge runner mill "MPUV-Model 2" (Manufactured by Kabushiki Kaisha Matsumoto Chuzo Tekkosho), and compacted and pulverized for 60 minutes at a line load of 75 kg/cm.

The amount of Al adhered to the granular BaO·4.5Fe$_2$O$_3$ particles was 4.00 wt %, and the parameter α was 0.53.

After 4.5 kg of the granular BaO·4.5Fe$_2$O$_3$ particles obtained were mixed with water and stirred again, an aqueous NaOH solution of 0.1 mol/liter was added to adjust the pH to 10.6. Thereafter, 778.5 g (equivalent to 5.00 wt % of the BaO·4.5Fe$_2$O$_3$ particles calculated as SiO$_2$) of a water glass #3 solution was added to the solution, and the mixed suspension was stirred. While stirring the mixed suspension, an aqueous solution of HCl of 1.0 mol/liter was added so as to adjust the pH to 7.9. The time taken for the adjustment was 5 minutes. The precipitate was immediately filtered out, washed with water and dried by an ordinary method to obtain granular BaO·4.5Fe$_2$O$_3$ particles.

4 kg of the thus-obtained granular BaO·4.5Fe$_2$O$_3$ particles were charged into an edge runner mill "MPUV-Model 2" (manufactured by Kabushiki Kaisha Matsumoto Chuzo Tekkosho), and compacted and pulverized for 30 minutes at a line load of 75 kg/cm.

The average particle diameter of the thus-obtained granular BaO·4.5Fe$_2$O$_3$ particles with the Al compound and the Si compound adhered thereto was 0.023 μm, and the BET specific surface area was 80.3 m$^2$/g. The parameter α was 0.58.

Examples 32 to 38

Granular BaO·4.5Fe$_2$O$_3$ particles with Al, Si or another compound adhered thereto were produced in the same manner as in Example 31 except for varying the kind of particles to be treated, the kind and the amount of compound added, the pH of the suspension, the time for adding a solution and stirring the suspension for the purpose of adjusting the pH, the time and the linear load for compaction, the number of times of surface treatments.

The main producing conditions and various properties of the products are shown in Tables 7 to 8.

Production of non-magnetic undercoating layer for magnetic recording medium

Examples 39 to 60

Comparative Examples 23 to 30

Example 39

The granular BaO·4.5Fe$_2$O$_3$ particles obtained in Example 17 were mixed with a binder resin and a solvent so that the solid content was 75 wt %, an the obtained mixture was kneaded for 30 minutes by a plasticoder. Thereafter, a predetermined amount of kneaded product was taken out and charged into a glass bottle together with glass beads and a solvent. The resultant mixture was mixed and dispersed for 6 hours by a paint conditioner.

The final composition of the coating film composition obtained was as follows:

| | |
|---|---|
| Granular BaO.4.5 Fe$_2$O$_3$ particles | 100 parts by weight |
| Vinyl chloride-vinyl acetate copolymer having a sodium sulfonate group | 10 parts by weight |
| Polyurethane having a sodium sulfonate group | 10 parts by weight |
| Cyclohexanone | 40.9 parts by weight |
| Methyl ethyl ketone | 102.2 parts by weight |
| Toluene | 61.3 parts by weight |

The coating film composition obtained was applied to polyethylene terephthalate film having a thickness of 14 μm to a thickness of 55 μm by using an applicator, and dried to obtain a non-magnetic undercoating layer. The thickness of the non-magnetic undercoating layer was 3.6 μm.

The non-magnetic undercoating layer obtained had a Young's modulus of 101, a gloss of 152% and a surface roughness (Ra) of 15.6 nm.

Examples 40 to 60 and Comparative Examples 23 to 30

Non-magnetic undercoating layers for a magnetic recording medium were produced in the same manner as in Example 39 by using the granular BaO·4.5Fe$_2$O$_3$ particles obtained in Examples 40 to 60 and the non-magnetic particles shown in Table 9 for comparison (Comparative Examples 15 to 22).

Various properties of the products are shown in Tables 10 and 12.

Production of magnetic tape

Examples 61 to 95

Comparative Examples 31 to 40

Example 61

Co-coated magnetic iron oxide particles (average major axial diameter: 0.19 μm, average minor axial diameter: 0.026 μm, Hc: 912 Oe, σs: 80.0 emu/g) obtained in Example 9 were first mixed as magnetic particles with a binder resin and a solvent, so that the solid content was 76 wt %, the obtained mixture was kneaded for 30 minutes by a plasticoder. Thereafter, a predetermined amount of kneaded product was taken out and charged into a glass bottle together with glass beads and a solvent. The resultant mixture was mixed and dispersed for 6 hours by a paint conditioner. Thereafter, a polishing agent, a lubricant and a curing agent were added, and the obtained mixture was further mixed and dispersed for 15 minutes. The composition of the coating material obtained was as follows:

| | |
|---|---|
| Co-coated magnetic iron oxide particles | 100 parts by weight |
| Vinyl chloride-vinyl acetate copolymer having a sodium sulfonate group | 10 parts by weight |
| Polyurethane having a sodium sulfonate group | 10 parts by weight |
| Polishing agent | 10 parts by weight |
| Lubricant | 2.5 parts by weight |
| Curing agent | 5 parts by weight |
| Cyclohexanone | 52.2 parts by weight |
| Methyl ethyl ketone | 130.5 parts by weight |
| Toluene | 78.3 parts by weight |

The coating material obtained was applied to the non-magnetic undercoating layer obtained in Example 9 to a thickness of 15 μm by using an applicator and dried to obtain a sheet-like sample.

The sheet-like sample was calendered, and cured at a temperature of 60° C. for 24 hours. The sheet-like sample was then slit to a width of 0.5 inch to obtain a magnetic tape.

The magnetic recording layer of the magnetic tape obtained had a thickness if 1.3 μm. The magnetic tape had a coercive force (Hc) of 951 Oe, a squareness of 0.90, a gloss of 185%, a surface roughness (Ra) of 5.6 nm, a Young's modulus of 135, and a linear adsorption coefficient of 1.24.

Examples 62 to 66 Comparative Examples 31 to 34

Magnetic recording media were produced in the same manner as in Example 61 by using the non-magnetic undercoating layers for a magnetic recording medium obtained in Examples 9, 11 and 14 and Comparative Examples 8 and 13.

Various properties of the products are shown in Table 13.

Example 67

A magnetic tape was produced in the same manner as in Example 67 except for using metal magnetic particles (average major axial diameter: 0.12 μm, average minor axial diameter: 0.015 μm, aspect ratio: 8, Hc: 1610 Oe, σs: 118.2 emu/g, BET specific surface area: 55.3 m²/g), using the non-magnetic undercoating layer obtained in Example 39.

The magnetic tape obtained had a coercive force (Hc) of 1680 Oe, a squareness of 0.88, a gloss of 198%, a surface roughness (Ra) of 8.0 nm, a signal recording property of +1.0 dB, and a vibration proofness of Δ0.3 dB,

Examples 68 to 95, Comparative Examples 35 to 40

Magnetic tapes were produced in the same manner as in Example 55 except for varying the kind of non-magnetic undercoating layer and the kind of magnetic particles used for the magnetic recording layer.

Various properties of the products are shown in Tables 14 and 16.

TABLE 1

Production of acicular α-Fe$_2$O$_3$ particles

| | Acicular geothite particles | | | | | |
|---|---|---|---|---|---|---|
| Examples and Comparative Examples | Major axial diameter (μm) | Minor axial diameter (μm) | Aspect ratio (-) | BET specific surface area (m²/g) | Dehydration Temperature (°C.) | Time (min) |
| Ex. 1 | 0.20 | 0.019 | 10.5 | 134.4 | 500 | 75 |
| Ex. 2 | 0.20 | 0.019 | 10.5 | 134.4 | 500 | 75 |
| Ex. 3 | 0.20 | 0.019 | 10.5 | 134.4 | 500 | 75 |
| Ex. 4 | 0.20 | 0.019 | 10.5 | 134.4 | 500 | 75 |
| Ex. 5 | 0.20 | 0.019 | 10.5 | 134.4 | 500 | 75 |
| Ex. 6 | &.22 | 0.022 | 10.0 | 84.5 | 450 | 45 |
| Ex. 7 | 0.22 | 0.022 | 10.0 | 84.5 | 450 | 45 |
| Ex. 8 | 0.25 | 0.024 | 10.4 | 70.3 | 480 | 60 |
| Comp. Ex. 1 | 0.20 | 0.019 | 10.5 | 134.4 | 500 | 75 |
| Comp. Ex. 2 | 0.20 | 0.019 | 10.5 | 134.4 | 500 | 75 |
| Comp. Ex. 3 | 0.20 | 0.019 | 10.5 | 134.4 | 500 | 75 |

TABLE 1-continued

| | | | | | | |
|---|---|---|---|---|---|---|
| Comp. Ex. 4 | 0.22 | 0.022 | 10.0 | 84.5 | 450 | 45 |
| Comp. Ex. 5 | 0.25 | 0.024 | 10.4 | 70.3 | 480 | 60 |
| Comp. Ex. 6 | 0.20 | 0.019 | 10.5 | 134.4 | — | — |
| Comp. Ex. 7 | — | — | — | — | — | — |

Production of acicular $\alpha$-$Fe_2O_3$ particles

Properties of $\alpha$-$Fe_2O_3$ particles

| | Annealing | | Major axial diameter ($\mu$m) | Minor axial diameter ($\mu$m) | Aspect ratio (-) | BET specific surface area ($m^2$/g) |
|---|---|---|---|---|---|---|
| | Temperature (°C.) | Time (min) | | | | |
| Ex. 1 | 630 | 100 | 0.13 | 0.023 | 5.7 | — |
| Ex. 2 | 630 | 100 | 0.13 | 0.022 | 5.9 | — |
| Ex. 3 | 630 | 100 | 0.14 | 0.023 | 6.1 | — |
| Ex. 4 | 630 | 100 | 0.14 | 0.023 | 6.1 | — |
| Ex. 5 | 630 | 100 | 0.13 | 0.022 | 5.9 | — |
| Ex. 6 | 650 | 150 | 0.16 | 0.028 | 5.7 | — |
| Ex. 7 | 650 | 150 | 0.17 | 0.028 | 6.1 | — |
| Ex. 8 | 650 | 120 | 0.24 | 0.034 | 7.1 | — |
| Comp. Ex. 1 | 630 | 100 | 0.13 | 0.020 | 6.5 | — |
| Comp. Ex. 2 | 630 | 100 | 0.14 | 0.022 | 6.4 | — |
| Comp. Ex. 3 | 630 | 100 | 0.13 | 0.021 | 6.2 | — |
| Comp. Ex. 4 | 650 | 150 | 0.16 | 0.028 | 5.7 | — |
| Comp. Ex. 5 | 650 | 120 | 0.25 | 0.035 | 7.1 | — |
| Comp. Ex. 6 | — | — | — | — | — | — |
| Comp. Ex. 7 | — | — | *0.17 | 0.12 | 1.4 | 13.8 |

(Note)
*: Granular $\alpha$-$Fe_2O_3$ particles obtained by firing magnetite particles were used.

TABLE 2

Production of adhered acicular $\alpha$-$Fe_2O_3$ particles (First Treatment)
Production of mixture of $\alpha$-$Fe_2O_3$ particles and hydroxide

| Examples | pH before adjustment (-) | Kind | Calculated as | Amount added (wt %) | pH after adjustment (-) | Adjusting time (min) |
|---|---|---|---|---|---|---|
| Ex. 1 | 10.5 | Sodium aluminate | Al | 3.00 | 7.1 | 5 |
| Ex. 2 | 10.8 | Sodium aluminate | Al | 5.00 | 7.2 | 7 |
| | | Water glass #3 | $SiO_2$ | 4.50 | | |
| Ex. 3 | 11.0 | Water glass #3 | $SiO_2$ | 0.50 | 6.8 | 3 |
| Ex. 4 | 10.7 | Aluminum sulfate | Al | 1.50 | 7.0 | 6 |
| | | zirconium sulfate | Zr | 3.00 | | |
| Ex. 5 | 11.0 | Sodium aluminate | Al | 1.00 | 7.5 | 5 |
| | | Zinc sulfate | Zn | 2.00 | | |
| Ex. 6 | 10.4 | Aluminum sulfate | Al | 2.50 | 7.0 | 7 |
| | | Water glass #3 | $SiO_2$ | 2.50 | | |
| Ex. 7 | 10.5 | Water glass #3 | $SiO_2$ | 5.00 | 6.5 | 5 |
| | | hexametha-phophate | P | 1.00 | | |
| Ex. 8 | 11.8 | Water glass #3 | $SiO_2$ | 15.00 | 6.5 | 8 |
| | | Antimony sulfate | Sb | 3.00 | | |

Production of adhered acicular $\alpha$-$Fe_2O_3$ particles (First Treatment)

Properties of $\alpha$-$Fe_2O_3$ particles

| | Compaction | | | | Major axial diameter ($\mu$m) | Minor axial diameter ($\mu$m) |
|---|---|---|---|---|---|---|
| | Linear load (kg/cm) | Time (min) | Calculated as | Amount adhered (wt %) | | |
| Ex. 1 | 60 | 60 | Al | 2.99 | — | — |
| Ex. 2 | 60 | 60 | Al | 5.01 | 0.13 | 0.023 |
| | | | $SiO_2$ | 4.46 | | |
| Ex. 3 | 60 | 60 | $SiO_2$ | 0.48 | — | — |
| Ex. 4 | 45 | 45 | Al | 1.50 | 0.14 | 0.023 |
| | | | Zr | 3.01 | | |

TABLE 2-continued

| | | | | | | |
|---|---|---|---|---|---|---|
| Ex. 5 | 60 | 60 | Al | 0.99 | — | — |
| | | | Zn | 1.98 | | |
| Ex. 6 | 60 | 60 | Al | 2.50 | — | — |
| | | | SiO$_2$ | 2.38 | | |
| Ex. 7 | 45 | 30 | SiO$_2$ | 4.78 | — | — |
| | | | P | 0.92 | | |
| Ex. 8 | 75 | 60 | SiO$_2$ | 13.86 | 0.24 | 0.34 |
| | | | Sb | 3.03 | | |

Production of adhered acicular α-Fe$_2$O$_3$ particles (First Treatment)
Properties of α-Fe$_2$O$_3$ particles

| | Aspect ratio (-) | Geometrical standard deviation σg | BET specific surface area (m$^2$/g) | Parameter α (-) |
|---|---|---|---|---|
| Ex. 1 | — | — | — | 0.55 |
| Ex. 2 | 5.7 | 1.36 | 58.8 | 0.58 |
| Ex. 3 | — | — | — | 0.51 |
| Ex. 4 | 6.1 | 1.35 | 58.8 | 0.55 |
| Ex. 5 | — | — | — | 0.55 |
| Ex. 6 | — | — | — | 0.57 |
| Ex. 7 | — | — | — | 0.52 |
| Ex. 8 | 7.1 | 1.30 | 42.1 | 0.55 |

TABLE 3

Production of adhered acicular α-Fe$_2$O$_3$ particles (Second Treatment)
Production of mixture of α-Fe$_2$O$_3$ particles and hydroxide

| Examples | pH before adjustment (-) | Kind | Calculated as | Amount added (wt %) | pH after adjustment (-) | Adjusting time (min) |
|---|---|---|---|---|---|---|
| Ex. 1 | 11.0 | Water glass #3 | SiO$_2$ | 2.00 | 7.5 | 4 |
| Ex. 3 | 12.3 | Aluminum acetate | Al | 8.00 | 7.0 | 6 |
| Ex. 5 | 12.8 | Colloidal silica | SiO$_2$ | 0.50 | 6.8 | 7 |
| | | Titanyl sulfate | Ti | 1.50 | | |
| Ex. 6 | 12.0 | Aluminum sulfate | Al | 2.50 | 7.1 | 6 |
| | | Water glass #3 | SiO$_2$ | 2.50 | | |
| Ex. 7 | 11.5 | Sodium aluminate | Al | 1.00 | 7.0 | 5 |
| | | Magnesium sulfate | Mg | 1.00 | | |

Production of adhered acicular α-Fe$_2$O$_3$ particles (Second Treatment)
Properties of α-Fe$_2$O$_3$ particles

| | Compaction | | | | Major axial diameter (μm) | Minor axial diameter (μm) |
|---|---|---|---|---|---|---|
| | Linear load (kg/cm) | Time (min) | Calculated as | Amount adhered (wt %) | | |
| Ex. 1 | 60 | 30 | SiO$_2$ | 1.87 | 0.13 | 0.023 |
| Ex. 3 | 60 | 60 | Al | 7.86 | 0.13 | 0.023 |
| Ex. 5 | 45 | 45 | SiO$_2$ | 0.48 | 0.13 | 0.022 |
| | | | Ti | 1.48 | | |
| Ex. 6 | 60 | 60 | Al | 2.47 | 0.16 | 0.028 |
| | | | SiO$_2$ | 2.28 | | |

TABLE 3-continued

| | | | | | |
|---|---|---|---|---|---|
| Ex. 7 | 30 | 30 | Al | 0.99 | 0.17 | 0.028 |
| | | | Mg | 0.86 | | |

Production of adhered acicular α-Fe$_2$O$_3$ particles (First Treatment)
Properties of α-Fe$_2$O$_3$ particles

| | Aspect ratio (-) | Geometrical standard deviation σg | BET specific surface area (m$^2$/g) | Parameter α (-) |
|---|---|---|---|---|
| Ex. 1 | 5.7 | 1.36 | 59.8 | 0.58 |
| Ex. 3 | 5.7 | 1.36 | 58.6 | 0.61 |
| Ex. 5 | 5.9 | 1.36 | 58.8 | 0.57 |
| Ex. 6 | 5.7 | 1.33 | 45.6 | 0.60 |
| Ex. 7 | 6.1 | 1.32 | 47.1 | 0.55 |

TABLE 4

Production of adhered acicular α-Fe$_2$O$_3$ particles (First Treatment)
Production of mixture of α-Fe$_2$O$_3$ particles and hydroxide

| Comparative Examples | pH before adjustment (-) | Kind | Calculated as | Amount added (wt %) | pH after adjustment (-) | Adjusting time (min) |
|---|---|---|---|---|---|---|
| Comp. Ex. 1 | — | — | — | — | — | — |
| Comp. Ex. 2 | — | — | — | — | — | — |
| Comp. Ex. 3 | 11.8 | Sodium aluminate | Al | 0.50 | 7.1 | 60 |
| Comp. Ex. 4 | — | — | — | — | — | — |
| Comp. Ex. 5 | — | — | — | — | — | — |
| Comp. Ex. 6 | — | — | — | — | — | — |
| Comp. Ex. 7 | — | — | — | — | — | — |

Production of adhered acicular α-Fe$_2$O$_3$ particles (First Treatment)
Properties of α-Fe$_2$O$_3$ particles

| | Compaction | | | | Major axial diameter (μm) | Minor axial diameter (μm) |
|---|---|---|---|---|---|---|
| | Linear load (kg/cm) | Time (min) | Calculated as | Amount adhered (wt %) | | |
| Comp. Ex. 1 | — | — | — | — | 0.13 | 0.021 |
| Comp. Ex. 2 | 60 | 60 | — | — | 0.13 | 0.022 |
| Comp. Ex. 3 | — | — | Al | 0.50 | 0.13 | 0.022 |
| Comp. Ex. 4 | 30 | 30 | — | — | 0.16 | 0.028 |
| Comp. Ex. 5 | — | — | — | — | 0.25 | 0.035 |
| Comp. Ex. 6 | — | — | — | — | 0.20 | 0.019 |
| Comp. Ex. 7 | — | — | — | — | 0.17 | 0.12 |

TABLE 4-continued

Production of adhered acicular α-Fe$_2$O$_3$ particles (First Treatment)

Properties of α-Fe$_2$O$_3$ particles

| | Aspect ratio (-) | Geometrical standard deviation σg | BET specific surface area (m$^2$/g) | Parameter α (-) |
|---|---|---|---|---|
| Comp. Ex. 1 | 6.2 | 1.36 | 59.3 | 0.29 |
| Comp. Ex. 2 | 5.9 | 1.37 | 58.9 | 0.31 |
| Comp. Ex. 3 | 5.9 | 1.36 | 57.9 | 0.42 |
| Comp. Ex. 4 | 5.7 | 1.33 | 44.1 | 0.32 |
| Comp. Ex. 5 | 7.1 | 1.31 | 40.6 | 0.32 |
| Comp. Ex. 6 | 10.1 | 1.32 | 134.4 | 0.28 |
| Comp. Ex. 7 | 1.4 | 1.56 | 13.4 | 0.30 |

Note:
Goethite particles in Comp. 6 and granular α-Fe$_2$O$_3$ particles in Comp. 7.

TABLE 5

Properties of non-magnetic undercoat layer

| Examples and Comparative Examples | Kind of Non-magnetic particles | Gloss 45° (%) | Surface roughness of coating film Ra (nm) | Young's modulus (relative value) of coating film (-) | Thickness of coating film (μm) |
|---|---|---|---|---|---|
| Ex. 9 | Ex. 1 | 226 | 8.8 | 125 | 3.3 |
| Ex. 10 | Ex. 2 | 212 | 9.2 | 126 | 3.5 |
| Ex. 11 | Ex. 3 | 218 | 9.2 | 120 | 3.4 |
| Ex. 12 | Ex. 4 | 206 | 9.6 | 118 | 3.2 |
| Ex. 13 | Ex. 5 | 199 | 10.0 | 125 | 3.1 |
| Ex. 14 | Ex. 6 | 193 | 11.8 | 138 | 3.3 |
| Ex. 15 | Ex. 7 | 181 | 12.6 | 140 | 3.1 |
| Ex. 16 | Ex. 8 | 176 | 13.8 | 146 | 3.5 |
| Comp. Ex. 8 | Comp. Ex. 1 | 142 | 22.8 | 85 | 3.5 |
| Comp. Ex. 9 | Comp. Ex. 2 | 148 | 20.8 | 90 | 3.5 |
| Comp. Ex. 10 | Comp. Ex. 3 | 165 | 16.6 | 98 | 3.3 |
| Comp. Ex. 11 | Comp. Ex. 4 | 132 | 24.5 | 95 | 3.3 |
| Comp. Ex. 12 | Comp. Ex. 5 | 136 | 23.8 | 98 | 3.6 |
| Comp. Ex. 13 | Comp. Ex. 6 | 86 | 33.6 | 82 | 3.4 |
| Comp. Ex. 14 | Comp. Ex. 7 | 90 | 42.0 | 60 | 3.3 |

TABLE 6

| | Granular BaO.4.5Fe$_2$O$_3$ | | Coating with Al or another metal compound | | |
|---|---|---|---|---|---|
| Examples | Average particle diameter (μm) | BET specific surface area (m$^2$/g) | Kind | pH of suspension | Amount adhered (wt %) |
| Ex. 17 | 0.022 | 79.8 | — | — | — |
| Ex. 18 | 0.040 | 50.1 | — | — | — |
| Ex. 19 | 0.022 | 79.8 | Sodium aluminate | 7.0 | 2.98 |
| Ex. 20 | 0.022 | 79.8 | Aluminum sulfate | 7.0 | 0.50 |
| Ex. 21 | 0.040 | 50.1 | Aluminum sulfate | 7.0 | 9.95 |
| Ex. 22 | 0.022 | 79.8 | Aluminum sulfate | 8.0 | 4.99 |
| | | | Water glass #3 | 7.0 | 3.00 |
| Ex. 23 | 0.022 | 79.8 | Aluminum sulfate | 7.5 | 3.01 |
| | | | Zirconium sulfate | 8.0 | 2.97 |
| Ex. 24 | 0.040 | 50.1 | Aluminum sulfate | 6.8 | 1.00 |
| | | | Zinc chloride | 8.0 | 5.03 |
| Ex. 25 | 0.022 | 79.8 | Sodium aluminate | 7.5 | 5.03 |
| Ex. 26 | 0.022 | 79.8 | Sodium aluminate | 8.3 | 2.99 |
| | | | Water glass #3 | 6.8 | 2.01 |
| Ex. 27 | 0.040 | 50.1 | Aluminum sulfate | 8.0 | 1.01 |
| | | | Titanyl sulfate | 7.0 | 1.01 |
| Ex. 28 | 0.022 | 79.8 | — | — | — |
| Ex. 29 | 0.022 | 79.8 | — | — | — |
| Ex. 30 | 0.040 | 50.1 | — | — | — |

| | Coating with coupling agent | | |
|---|---|---|---|
| | Kind | pH of suspension | Amount adhered (wt %) |
| Ex. 17 | — | — | — |
| Ex. 18 | — | — | — |
| Ex. 19 | — | — | — |
| Ex. 20 | — | — | — |
| Ex. 21 | — | — | — |
| Ex. 22 | — | — | — |
| Ex. 23 | — | — | — |
| Ex. 24 | — | — | — |
| Ex. 25 | γ-aminopropyltrimethoxysilane (A-1100: produced by Nippon Unicar Co., Ltd.) | Dry process | 3.0 |
| Ex. 26 | Isopropyltri(n-aminoethyl-aminoethyl) titanate (KR-44: produced by Ajinomoto Co., Ltd.) | Wet process (water) | 1.0 |
| Ex. 27 | γ-glycidoxypropyltrimethoxysilane (A-187: produced by Nippon Unicar Co., Ltd.) | Wet process (solvent) | 2.0 |
| Ex. 28 | γ-aminopropyltrimethoxysilane (A-1100: produced by Nippon Unicar Co., Ltd.) | Dry process | 5.0 |
| Ex. 29 | Acetoalkoxyaluminum diisopropylate (AL-M: produced by Ajinomoto Co., Ltd.) | Dry process | 10.0 |
| Ex. 30 | Isopropyltri(N-aminoethyl-aminoethyl) titanate (KR-44: produced by Ajinomoto Co., Ltd.) | Dry process | 1.0 |

TABLE 6-continued

| | Adhered granular BaO.4.5Fe$_2$O$_3$ particles | |
|---|---|---|
| | Average particle diameter ($\mu$m) | BET specific surface area (m$^2$/g) |
| Ex. 17 | 0.022 | 79.8 |
| Ex. 18 | 0.040 | 50.1 |
| Ex. 19 | 0.023 | 79.5 |
| Ex. 20 | 0.023 | 80.0 |
| Ex. 21 | 0.040 | 49.5 |
| Ex. 22 | 0.024 | 80.1 |
| Ex. 23 | 0.023 | 79.6 |
| Ex. 24 | 0.040 | 49.0 |
| Ex. 25 | 0.022 | 74.2 |
| Ex. 26 | 0.023 | 78.6 |
| Ex. 27 | 0.040 | 45.1 |
| Ex. 28 | 0.022 | 75.0 |
| Ex. 29 | 0.022 | 72.1 |
| Ex. 30 | 0.040 | 48.5 |

TABLE 7

Production of adhered granular BaO.4.5 Fe$_2$O$_3$ particles (First Treatment)
Production of mixture of BaO.4.5 Fe$_2$O$_3$ particles and hydroxide

| Examples | Kind of Non-magnetic particles | | pH before adjustment (-) | Kind | Calculated as | Amount added (wt %) | pH after adjustment (-) |
|---|---|---|---|---|---|---|---|
| Ex. 31 | 0.022 | 80.1 | 11.0 | Sodium aluminate | Al | 4.00 | 7.0 |
| Ex. 32 | 0.022 | 80.1 | 10.8 | Sodium aluminate | Al | 2.00 | 6.8 |
| | | | | Water glass #3 | SiO$_2$ | 2.50 | |
| Ex. 33 | 0.022 | 80.1 | 10.5 | Water glass #3 | SiO$_2$ | 0.50 | 7.0 |
| Ex. 34 | 0.022 | 80.1 | 11.0 | Sodium aluminate | Al | 0.75 | 7.5 |
| | | | | Zirconium sulfate | Zr | 1.00 | |
| Ex. 35 | 0.022 | 80.1 | 10.6 | Aluminum sulfate | Al | 1.00 | 7.8 |
| Ex. 36 | 0.040 | 50.3 | 10.5 | Water glass #3 | SiO$_2$ | 2.50 | 6.8 |
| | | | | | Zn | 2.50 | |
| Ex. 37 | 0.040 | 50.3 | 11.2 | Water glass #3 | SiO$_2$ | 1.00 | 7.0 |
| | | | | | P | 0.50 | |
| Ex. 38 | 0.040 | 50.3 | 10.9 | Sodium aluminate | SiO$_2$ | 10.50 | 7.5 |
| | | | | Titanyl sulfate | Ti | 2.50 | |

Production of coated granular BaO.4.5 Fe$_2$O$_3$ particles (First Treatment)

| | Adjusting time (min.) | Compaction Linear load (kg/cm) | Time (min) | Calculated as | Amount adhered (wt %) | Properties of BaO.4.5 Fe$_2$O$_3$ particles Average particle diameter ($\mu$m) |
|---|---|---|---|---|---|---|
| Ex. 31 | 5 | 75 | 60 | Al | 4.00 | — |
| Ex. 32 | 5 | 80 | 60 | Al | 2.00 | 0.022 |
| | | | | SiO$_2$ | 2.46 | |
| Ex. 33 | 3 | 60 | 35 | SiO$_2$ | 0.49 | — |
| Ex. 34 | 6 | 60 | 60 | Al | 0.75 | 0.022 |
| | | | | Zr | 0.99 | |
| Ex. 35 | 5 | 45 | 30 | Al | 1.01 | — |
| Ex. 36 | 8 | 60 | 60 | SiO$_2$ | 2.45 | 0.041 |
| | | | | Zn | 2.48 | |
| Ex. 37 | 6 | 75 | 60 | SiO$_2$ | 0.97 | — |
| | | | | P | 0.51 | |
| Ex. 38 | 8 | 80 | 60 | Al | 10.48 | 0.038 |
| | | | | Ti | 2.49 | |

| | Properties of BaO.4.5 Fe$_2$O$_3$ particles | |
|---|---|---|
| | BET specific surface area (m$^2$/g) | Parameter $\alpha$ (-) |
| Ex. 31 | — | 0.53 |
| Ex. 32 | 82.2 | 0.59 |
| Ex. 33 | — | 0.51 |
| Ex. 34 | 81.0 | 0.57 |
| Ex. 35 | — | 0.54 |
| Ex. 36 | 51.2 | 0.56 |
| Ex. 37 | — | 0.53 |
| Ex. 38 | 46.9 | 0.57 |

TABLE 8

Production of adhered granular BaO.4.5 Fe$_2$O$_3$ particles (Second Treatment)
Production of mixture of BaO.4.5 Fe$_2$O$_3$ particles and hydroxide

| Examples | Kind of Non-magnetic particles | | pH before adjustment (-) | Kind | Calculated as | Amount added (wt %) | pH after adjustment (-) |
|---|---|---|---|---|---|---|---|
| Ex. 31 | 0.022 | 80.1 | 10.6 | Water glass #3 | SiO$_2$ | 5.00 | 7.9 |
| Ex. 33 | 0.022 | 80.1 | 11.8 | Sodium aluminate | Al | 8.00 | 7.5 |
| Ex. 35 | 0.022 | 80.1 | 11.5 | Colloidal silica | SiO$_2$ | 6.00 | 8.0 |
| | | | | Magnesium sulfate | Mg | 3.00 | |
| Ex. 37 | 0.040 | 50.3 | 11.0 | Water glass #3 | SiO$_2$ | 5.00 | 7.0 |
| | | | | Antimony sulfate | Sb | 1.00 | |

Production of coated granular BaO.4.5 Fe$_2$O$_3$ particles (Second Treatment)

| | Adjusting time (min.) | Compaction Linear load (kg/cm) | Time (min) | Calculated as | Amount adhered (wt %) | Properties of BaO.4.5 Fe$_2$O$_3$ particles Average particle diameter ($\mu$m) |
|---|---|---|---|---|---|---|
| Ex. 31 | 5 | 75 | 30 | SiO2 | 4.89 | 0.023 |
| Ex. 33 | 6 | 75 | 60 | Al | 8.00 | 0.023 |
| Ex. 35 | 8 | 60 | 60 | SiO$_2$ | 5.86 | 0.022 |
| | | | | Mg | 2.78 | |
| Ex. 37 | 6 | 75 | 60 | SiO$_2$ | 4.92 | 0.040 |
| | | | | Sb | 1.00 | |

TABLE 8-continued

| | Properties of BaO.4.5 Fe$_2$O$_3$ particles | |
|---|---|---|
| | BET specific surface area (m$^2$/g) | Parameter α (-) |
| Ex. 31 | 80.3 | 0.58 |
| Ex. 33 | 78.6 | 0.61 |
| Ex. 35 | 83.2 | 0.58 |
| Ex. 37 | 51.2 | 0.55 |

TABLE 9

| | Non-magnetic particles | | |
|---|---|---|---|
| Comparative Examples | Kind | Average particle diameter (μm) | BET specific surface area (m$^2$/g) |
| Comp. Ex. 15 | Titanium oxide | 0.030 | 40.1 |
| Comp. Ex. 16 | Titanium oxide | 0.102 | 17.2 |
| Comp. Ex. 17 | Iron oxide (α-Fe$_2$O$_3$) | 0.052 | 50.3 |
| Comp. Ex. 18 | Iron oxide (α-Fe$_2$O$_3$) | 0.170 | 10.2 |
| Comp. Ex. 19 | Silicon dioxide | 0.020 | 200.3 |
| Comp. Ex. 20 | Alunminum oxide | 0.405 | 9.7 |
| Comp. Ex. 21 | Carbon black | 0.022 | 134.0 |
| Comp. Ex. 22 | Carbon black | 0.040 | 56.1 |

TABLE 10

| | Non-magnetic undercoat layer | | | | |
|---|---|---|---|---|---|
| | | Thickness | Surface smoothness | | Strength |
| Examples | Kind of non-magnetic particles | of coating film (μm) | Gloss 45° (%) | Surface roughness Ra (nm) | Young's modulus (relative value) |
| Ex. 39 | Ex. 17 | 3.6 | 152 | 15.6 | 101 |
| Ex. 40 | Ex. 18 | 3.5 | 145 | 16.8 | 103 |
| Ex. 41 | Ex. 19 | 3.6 | 161 | 14.4 | 117 |
| Ex. 42 | Ex. 20 | 3.6 | 155 | 15.2 | 109 |
| Ex. 43 | Ex. 21 | 3.8 | 146 | 17.2 | 103 |
| Ex. 44 | Ex. 22 | 3.7 | 168 | 12.6 | 126 |
| Ex. 45 | Ex. 23 | 3.6 | 159 | 14.8 | 118 |
| Ex. 46 | Ex. 24 | 3.5 | 150 | 16.8 | 108 |
| Ex. 47 | Ex. 25 | 3.8 | 165 | 13.8 | 138 |
| Ex. 48 | Ex. 26 | 3.8 | 172 | 12.0 | 138 |
| Ex. 49 | Ex. 27 | 3.9 | 157 | 14.2 | 130 |

TABLE 11

| | Non-magnetic undercoat layer | | | | |
|---|---|---|---|---|---|
| | | Thickness | Surface smoothness | | Strength |
| Examples and Comparative Examples | Kind of non-magnetic particles | of coating film (μm) | Gloss 45° (%) | Surface roughness Ra (nm) | Young's modulus (relative value) |
| Ex. 50 | Ex. 28 | 3.7 | 148 | 16.8 | 120 |
| Ex. 51 | Ex. 29 | 3.5 | 155 | 15.0 | 126 |
| Ex. 52 | Ex. 30 | 3.5 | 141 | 17.4 | 118 |
| Comp. Ex. 23 | Comp. Ex. 15 | 3.6 | 137 | 19.6 | 89 |
| Comp. Ex. 24 | Comp. Ex. 16 | 3.5 | 103 | 34.3 | 85 |
| Comp. Ex. 25 | Comp. Ex. 17 | 3.4 | 132 | 20.2 | 85 |
| Comp. Ex. 26 | Comp. Ex. 18 | 3.3 | 91 | 41.6 | 83 |
| Comp. Ex. 27 | Comp. Ex. 19 | 3.6 | 62 | 69.6 | 32 |
| Comp. Ex. 28 | Comp. Ex. 20 | 3.7 | 78 | 56.3 | 78 |
| Comp. Ex. 29 | Comp. Ex. 21 | 3.6 | 60 | 84.2 | 72 |
| Comp. Ex. 30 | Comp. Ex. 22 | 3.6 | 35 | 106.0 | 40 |

TABLE 12

| | Properties of non-magnetic undercoat layer | | | | |
|---|---|---|---|---|---|
| Examples and Comparative Examples | Kind of Non-magnetic particles | Gloss 45° (%) | Surface roughness of coating film Ra (nm) | Young's modulus (relative value) of coating film (-) | Thickness of coating film (μm) |
| Ex. 53 | Ex. 31 | 170 | 12.2 | 120 | 3.2 |
| Ex. 54 | Ex. 32 | 172 | 11.8 | 118 | 3.3 |
| Ex. 55 | Ex. 33 | 168 | 12.4 | 116 | 3.2 |
| Ex. 56 | Ex. 34 | 165 | 14.0 | 113 | 3.4 |
| Ex. 57 | Ex. 35 | 168 | 13.6 | 108 | 3.6 |
| Ex. 58 | Ex. 36 | 156 | 15.8 | 136 | 3.1 |
| Ex. 59 | Ex. 37 | 153 | 16.2 | 128 | 3.3 |
| Ex. 60 | Ex. 38 | 148 | 17.6 | 138 | 2.9 |

TABLE 13

| Examples and Comparative Examples | Properties of magnetic tape | | | Coercive force Hc (Oe) |
|---|---|---|---|---|
| | Undercoat layer used | Magnetic particles used | | |
| Ex. 61 | Ex. 9 | Co-Coated Fe$_3$O$_4$ particles | | 951 |
| Ex. 62 | Ex. 11 | | | 956 |
| Ex. 63 | Ex. 14 | [major axial diameter | 0.19 μm | 961 |
| Comp. Ex. 31 | Comp. Ex. 8 | minor axial diameter Hc | 0.026 μm 912 Oe | 936 |
| Comp. Ex. 32 | Comp. Ex. 13 | σs Co content Fe$^{2+}$ content | 80.0 emu/g 5.36% 15.8%] | 929 |
| Ex. 64 | Ex. 9 | Magnetic metal particles | | 1836 |
| Ex. 65 | Ex. 11 | [Major axial diameter | 0.12 μm | 1827 |
| Ex. 66 | Ex. 14 | Minor axial diameter | 0.015 μm | 1830 |
| Comp. Ex. 33 | Comp. Ex. 8 | Hc σs | 1780 Oe 123.8 emu/g | 1803 |
| Comp. | Comp. | BET specific surface | 53.4 m$^2$/g | 1790 |

TABLE 13-continued

| Ex. 34 | Ex. 13 | area | |
| --- | --- | --- | --- |
| | | Co content | 5.8% |
| | | Al content | 1.7% |
| | | B content | 1.2%] |

Properties of magnetic tape

| | Squareness (-) | Gloss of coating film 45° (%) | Surface roughness of coating film Ra (nm) | Young's modulus (relative value) of coating film (-) | Thickness of magnetic coating film (μm) | Linear absorption (μm⁻¹) |
| --- | --- | --- | --- | --- | --- | --- |
| Ex. 61 | 0.90 | 185 | 5.6 | 135 | 1.3 | 1.24 |
| Ex. 62 | 0.90 | 180 | 6.0 | 132 | 1.3 | 1.22 |
| Ex. 63 | 0.90 | 180 | 6.2 | 133 | 1.3 | 1.25 |
| Comp. Ex. 31 | 0.85 | 140 | 12.6 | 115 | 1.2 | 1.10 |
| Comp. Ex. 32 | 0.82 | 116 | 14.4 | 104 | 1.4 | 1.16 |
| Ex. 64 | 0.89 | 246 | 5.2 | 132 | 1.5 | 1.34 |
| Ex. 65 | 0.89 | 240 | 5.4 | 130 | 1.6 | 1.31 |
| Ex. 66 | 0.88 | 240 | 6.8 | 130 | 1.5 | 1.25 |
| Comp. Ex. 33 | 0.85 | 185 | 17.6 | 108 | 1.3 | 1.16 |
| Comp. Ex. 34 | 0.84 | 146 | 28.8 | 93 | 1.4 | 1.15 |

TABLE 14

Magnetic recording layer

| Examples and Comparative Examples | Undercoat layer used | Magnetic particles used | | Thickness of magnetic coating film (μm) |
| --- | --- | --- | --- | --- |
| Ex. 67 | Ex. 39 | Magnetic metal particles | | 1.3 |
| Ex. 68 | Ex. 41 | [major axial diameter | 0.12 μm | 1.2 |
| Ex. 69 | Ex. 44 | minor axial diameter | 0.015 μm | 1.2 |
| Ex. 70 | Ex. 47 | Hc | 1610 Oe | 1.2 |
| Ex. 71 | Ex. 50 | σs | 118.2 emu/g | 1.3 |
| Comp. Ex. 35 | Comp. Ex. 23 | BET | 55.3 m²/g] | 1.3 |
| Comp. Ex. 36 | Comp. Ex. 27 | | | 1.2 |
| Ex. 72 | Ex. 39 | Hexagonal barium ferrite | | 1.2 |
| Ex. 73 | Ex. 42 | particles | | 1.1 |
| Ex. 74 | Ex. 45 | [plate surface diameter | 0.05 μm | 1.1 |
| Ex. 75 | Ex. 48 | plate ratio | 6 μm | 1.2 |
| Ex. 76 | Ex. 51 | Hc | 1290 Oe | 1.1 |
| Comp. Ex. 37 | Comp. Ex. 25 | σs BET | 58.2 emu/g 50.8 m²/g] | 1.3 |
| Comp. Ex. 38 | Comp. Ex. 28 | | | 1.3 |

| | Magnetic recording layer | | Magetic tape Magnetic characteristic | |
| --- | --- | --- | --- | --- |
| | Gloss of coating film 45° (%) | Surface roughness of coating film Ra (nm) | Coercive force (Hc) (Oe) | Squareness (Br/Bm) (-) |
| Ex. 67 | 198 | 8.0 | 1680 | 0.88 |
| Ex. 68 | 215 | 6.0 | 1696 | 0.89 |
| Ex. 69 | 226 | 5.6 | 1702 | 0.89 |
| Ex. 70 | 230 | 5.0 | 1712 | 0.90 |
| Ex. 71 | 202 | 6.4 | 1692 | 0.89 |
| Comp. Ex. 35 | 186 | 11.2 | 1673 | 0.86 |
| Comp. Ex. 36 | 162 | 21.8 | 1630 | 0.85 |
| Ex. 72 | 186 | 9.6 | 1340 | 0.80 |
| Ex. 73 | 205 | 5.8 | 1356 | 0.85 |
| Ex. 74 | 208 | 5.4 | 1375 | 0.87 |
| Ex. 75 | 214 | 5.2 | 1396 | 0.87 |
| Ex. 76 | 200 | 6.0 | 1363 | 0.83 |
| Comp. Ex. 37 | 172 | 11.2 | 1333 | 0.76 |
| Comp. Ex. 38 | 146 | 32.2 | 1314 | 0.74 |

Magnetic tape Vibration proofness

| | Signal recording property (10 MHz output) (dB) | Dispersion in envelope (dB) |
| --- | --- | --- |
| Ex. 67 | +1.0 | Δ0.3 |
| Ex. 68 | +2.6 | Δ0.2 |
| Ex. 69 | +2.6 | Δ0.2 |
| Ex. 70 | +2.8 | Δ0.2 |
| Ex. 71 | +2.5 | Δ0.3 |
| Comp. Ex. 35 | 0 | Δ0.8 |
| Comp. Ex. 36 | -3.0 | Δ1.2 |
| Ex. 72 | +1.0 | Δ0.2 |
| Ex. 73 | +2.7 | Δ0.1 |
| Ex. 74 | +3.0 | Δ0.1 |
| Ex. 75 | +2.8 | Δ0 |
| Ex. 76 | +2.6 | Δ0.1 |
| Comp. Ex. 37 | 0 | Δ0.6 |
| Comp. Ex. 38 | -5.5 | Δ1.1 |

TABLE 15

Magnetic recording layer

| Examples and Comparative Examples | Undercoat layer used | Magnetic particles used | | Thickness of magnetic coating film (μm) |
| --- | --- | --- | --- | --- |
| Ex. 77 | Ex. 40 | Co-coated Fe₃O₄ | | 1.2 |
| Ex. 78 | Ex. 43 | particles | | 1.2 |
| Ex. 79 | Ex. 46 | [major axial diameter | 0.22 μm | 1.2 |
| Ex. 80 | Ex. 49 | minor axial diameter | 0.030 μm | 1.2 |
| Ex. 81 | Ex. 52 | Hc | 915 Oe | 1.2 |
| Comp. Ex. 39 | Comp. Ex. 24 | σs BET | 81.6 emu/g 43.1 m²/g] | 1.1 |
| Comp. Ex. 40 | Comp. Ex. 29 | | | 1.1 |

| | Magnetic recording layer | | Magetic tape Magnetic characteristic | |
| --- | --- | --- | --- | --- |
| | Gloss of coating film 45° (%) | Surface roughness of coating film Ra (nm) | Coercive force (Hc) (Oe) | Squareness (Br/Bm) (-) |
| Ex. 77 | 150 | 10.2 | 970 | 0.89 |
| Ex. 78 | 158 | 8.6 | 972 | 0.91 |
| Ex. 79 | 164 | 8.0 | 981 | 0.92 |

TABLE 15-continued

| | | | | |
|---|---|---|---|---|
| Ex. 80 | 166 | 7.6 | 983 | 0.92 |
| Ex. 81 | 156 | 8.8 | 966 | 0.90 |
| Comp. Ex. 39 | 138 | 12.8 | 940 | 0.85 |
| Comp. Ex. 40 | 130 | 14.4 | 942 | 0.83 |

| | Magnetic tape Vibration proofness | |
|---|---|---|
| | Signal recording property (10 MHz output) (dB) | Dispersion in envelope (dB) |
| Ex. 77 | +2.2 | Δ0.2 |
| Ex. 78 | +4.5 | Δ0.2 |
| Ex. 79 | +5.5 | Δ0.2 |
| Ex. 80 | +5.9 | Δ0.1 |
| Ex. 81 | +4.5 | Δ0.1 |
| Comp. Ex. 39 | 0 | Δ0.9 |
| Comp. Ex. 40 | −0.9 | Δ1.5 |

TABLE 16

| Examples and Comparative Examples | Undercoat layer used | Magnetic recording layer | | Thickness of magnetic coating film (μm) |
|---|---|---|---|---|
| | | Magnetic particles used | | |
| Ex. 82 | Ex. 53 | Magnetic metal particles | | 1.1 |
| Ex. 83 | Ex. 54 | [major axial diameter | 0.10 μm | 1.2 |
| Ex. 84 | Ex. 55 | minor axial diameter | 0.013 μm | 1.1 |
| Ex. 85 | Ex. 56 | Hc | 1780 Oe | 1.1 |
| Ex. 86 | Ex. 58 | σs | 125.6 emu/g | 1.2 |
| Ex. 87 | Comp. Ex. 23 | BET | 51.5 m²/g | 1.1 |
| Ex. 88 | Comp. Ex. 26 | | | 1.3 |
| Ex. 89 | Ex. 53 | Hexagonal barium ferrite particles | | 1.0 |
| Ex. 90 | Ex. 54 | | 1.1 | |
| Ex. 91 | Ex. 55 | [plate surface diameter | 0.05 μm | 1.0 |
| Ex. 92 | Ex. 56 | plate ratio | 6 μm | 1.2 |
| Ex. 93 | Ex. 58 | Hc | 1380 Oe | 1.1 |
| Ex. 94 | Comp. Ex. 23 | σs | 57.6 emu/g | 1.0 |
| Ex. 95 | Comp. Ex. 26 | BET | 51.6 m²/g | 1.2 |

| | Magnetic recording layer | | Magetic tape | |
|---|---|---|---|---|
| | Gloss of coating film 45° (%) | Surface roughness of coating film Ra (nm) | Magnetic characteristic | |
| | | | Coercive force (Hc) (Oe) | Squareness (Br/Bm) (-) |
| Ex. 82 | 226 | 5.8 | 1875 | 0.89 |
| Ex. 83 | 236 | 5.4 | 1910 | 0.91 |
| Ex. 84 | 230 | 6.0 | 1865 | 0.88 |
| Ex. 85 | 218 | 6.8 | 1882 | 0.89 |
| Ex. 86 | 200 | 7.6 | 1865 | 0.88 |
| Ex. 87 | 168 | 13.6 | 1803 | 0.85 |
| Ex. 88 | 146 | 14.8 | 1796 | 0.83 |
| Ex. 89 | 206 | 6.0 | 1430 | 0.85 |
| Ex. 90 | 212 | 5.6 | 1486 | 0.87 |
| Ex. 91 | 206 | 6.0 | 1453 | 0.86 |

TABLE 16-continued

| | | | | |
|---|---|---|---|---|
| Ex. 92 | 196 | 6.4 | 1460 | 0.85 |
| Ex. 93 | 188 | 8.8 | 1446 | 0.83 |
| Ex. 94 | 146 | 18.8 | 1390 | 0.75 |
| Ex. 95 | 126 | 21.4 | 1383 | 0.70 |

| | Magnetic tape Vibration proofness | |
|---|---|---|
| | Signal recording property (10 MHz output) (dB) | Dispersion in envelope (dB) |
| Ex. 82 | +1.5 | Δ0.2 |
| Ex. 83 | +2.5 | Δ0 |
| Ex. 84 | +2.3 | Δ0.2 |
| Ex. 85 | +1.2 | Δ0.3 |
| Ex. 86 | +0.8 | Δ0.4 |
| Ex. 87 | 0 | Δ1.5 |
| Ex. 88 | −1.5 | Δ1.5 |
| Ex. 89 | +1.8 | Δ0.3 |
| Ex. 90 | +2.2 | Δ0.1 |
| Ex. 91 | +2.1 | Δ0.3 |
| Ex. 92 | +1.8 | Δ0.5 |
| Ex. 93 | +1.0 | Δ0.3 |
| Ex. 94 | 0 | Δ1.0 |
| Ex. 95 | −4.8 | Δ1.0 |

What is claimed is:

1. A magnetic recording medium, comprising:

a nonmagnetic substrate;

a non-magnetic undercoating layer consisting essentially of non-magnetic particles and a binder resin, coated on a surface thereof, and a magnetic recording layer composed of magnetic particles and a binder resin, and formed on said undercoating layer, said non-magnetic particles selected from the group consisting of:
(1) coated acicular or spindle-shaped α-$Fe_2O_3$ particles which have an average major axial diameter of 0.05 to 0.25 μm, an average minor axial diameter of 0.010 to 0.035 μm, an aspect ratio of 2 to 20 with a particle size distribution in geometrical standard deviation of not more than 1.40, said coated α-$Fe_2O_3$ particles produced by adhering 0.01 to 20 wt %, calculated as Al, $SiO_2$ or Al and $SiO_2$, and based on the weight of the uncoated acicular or spindle-shaped α-$Fe_2O_3$ particles, of an oxide or a hydroxide containing Al, Si or both Al and Si to the surfaces of acicular or spindle-shaped α-$Fe_2O_3$ particles, said coated α-$Fe_2O_3$ particles have a molecular weight-dependent parameter α which has a value of not less than 0.5 and is represented by the following formula:

$$As = K_1 \cdot M^\alpha$$

wherein M represents the number-average molecular weight of a binder resin, As represents the saturation adsorption of said binder resin, and $K_1$ represents a constant used for measuring As and dependent on the binder resin and a solvent, and (2) BaO·4.5$Fe_2O_3$ particles having an average particle diameter of not more than 0.1 μm wherein said non-magnetic undercoating layer is 1 to 10 μm in dry thickness; and said non-magnetic undercoating layer containing coated acicular or spindle-shaped α-$Fe_2O_3$ particles has a gloss at 45° of not less than 170% and a center-line average surface roughness of not more than 16 nm or said non-magnetic undercoating layer containing BaO·4.5Fe$_2$O$_3$ particles has a gloss of 45° of not less than 138%, and a center-line average surface roughness of not more than 19 nm.

2. A magnetic recording medium according to claim 1, wherein said BaO·4.5Fe$_2$O$_3$ particles are coated with a coating material selected from the group consisting of aluminum compounds, silica compounds, zinc compounds, zirconium compounds, silane coupling agents, titanate coupling agents, aluminate coupling agents, zirconate coupling agents and mixtures thereof.

3. A magnetic recording medium according to claim 2, wherein the coating material on the BaO·4.5Fe$_2$O$_3$ particles is selected from the group consisting of aluminum compounds, silica compounds, zinc compounds, zirconium compounds and a mixture thereof and the amount of said coating material is 0.01 to 50 wt %, calculated as Al, SiO$_2$, Zn, Zr or a mixture thereof, based on the weight of uncoated BaO·4.5Fe$_2$O$_3$ particles.

4. A magnetic recording medium according to claim 2, wherein the coating material on the BaO·4.5Fe$_2$O$_3$ particles is selected from the group consisting of silane coupling agents, titanate coupling agents, aluminate coupling agents, zirconate coupling agents and a mixture thereof, and the amount of said coating material is 0.01 to 20.0 wt %, based on the weight of uncoated BaO·4.5Fe$_2$O$_3$ particles.

5. A magnetic recording medium according to claim 1, wherein the BaO·4.5Fe$_2$O$_3$ particles have adhered to the surfaces thereof a coating of 0.01 to 20 wt %, calculated as Al, SiO$_2$ or Al, and SiO$_2$, and based on the weight of uncoated BaO·4.5Fe$_2$O$_3$ particles, of an oxide or a hydroxide containing Al, Si or both Al and Si to the surfaces of BaO·4.5Fe$_2$O$_3$ particles, and said BaO·4.5Fe$_2$O$_3$ particles have a molecular weight-dependent parameter α which has a value not less than 0.5 and is represented by the following formula $$As = K_1 \cdot M^\alpha$$

wherein M represents the number-average molecular weight of a binder resin, As represents the saturation adsorption of said binder resin, and K$_1$ represents a constant used for measuring As and dependent on the binder resin and a solvent.

6. A magnetic recording medium according to claim 1, wherein the content of said non-magnetic particles in said non-magnetic undercoating layer is 5 to 95 wt %.

7. A magnetic recording medium according to claim 1, wherein said acicular or spindle-shaped α-Fe$_2$O$_3$ particles are coated with all oxide or a hydroxide containing Al, Si or both Al and Si, said coating produced by adding an aqueous alkali solution to an aqueous suspension containing acicular or spindle-shaped α-Fe$_2$O$_3$ particles to adjust the pH of said suspension to not less than 10, adding an aqueous solution containing Al, Si or both Al and Si to the suspension, adjusting the pH of the suspension to approximate neutrality while stirring for 1 to 10 minutes to precipitate an oxide or hydroxide of Al, Si or both Al and Si, filtering out the coated particles with said oxide or hydroxide thereon to obtain a solid substance, washing with water and drying said solid substance, and compacting and pulverizing said solid substance by an edge runner mill.

8. A magnetic recording medium according to claim 1, wherein said acicular or spindle-shaped α-Fe$_2$O$_3$ particles are coated with an oxide or a hydroxide containing Al, Si or both Al and Si, said coating produced by adding an aqueous alkali solution to an aqueous suspension containing acicular or spindle-shaped α-Fe$_2$O$_3$ particles to adjust the pH of said suspension to not less than 10, adding an aqueous solution containing Al, Si or both Al and Si to the resultant suspension, adjusting the pH of the suspension to approximate neutrality while stirring in 1 to 10 minutes to precipitate an oxide or hydroxide of Al, Si or both Al and Si, filtering out the coated particles with said oxide or hydroxide thereon to obtain a solid substance, washing with water and drying said solid substance, compacting and pulverizing said solid substance by an edge runner mill, and repeating the steps taken from the addition of said aqueous alkali solution to said aqueous suspension containing said particle so as to adjust the pH of said suspension to not less than 10 to the compaction and pulverization of said mixture at least twice.

9. A magnetic recording medium according to claim 1, wherein said BaO·4.5Fe$_2$O$_3$ particles have a compressed density of 2.0 to 3.0 g/cm$^3$.

10. A magnetic recording medium according to claim 1, wherein said BaO·4.5Fe$_2$O$_3$ particles have a molecular weight-dependent parameter α which has a value not less than 0.5 and is represented by the following formula:

$$As = K_1 \cdot M^\alpha$$

wherein M represents the number-average molecular weight of a binder resin, As represents the saturation adsorption of said binder resin, and K$_1$ represents a constant used for measuring As and dependent on the binder resin and a solvent.

11. A magnetic recording medium comprising:

a non-magnetic substrate;

a non-magnetic undercoating layer consisting essentially of non-magnetic particles and a binder resin, coated on a surface of the substrate; and a magnetic recording layer composed of magnetic particles and a binder resin, and formed on said undercoating layer, said non-magnetic undercoating layer having a gloss at 45° of not less than 170%, and a center-line average surface roughness of not more than 16 nm, wherein said non-magnetic particles are coated acicular or spindle-shaped α-Fe$_2$O$_3$ particles which have an average major axial diameter of 0.05 to 0.25 μm, an average minor axial diameter of 0.010 to 0.035 μm, an aspect ratio of 12 to 20 with a particle size distribution in geometrical standard deviation of not more than 1.40, said coated α-Fe$_2$O$_3$ particles produced by adhering not less than 0.01 to 20 wt %, calculated as Al, SiO$_2$ or Al and SiO$_2$, and based on the weight of the uncoated acicular or spindle-shaped α-Fe$_2$O$_3$ particles, of an oxide or a hydroxide containing Al, Si or both Al and Si to the surfaces of acicular or spindle-shaped α-Fe$_2$O$_3$ particles and said coated α-Fe$_2$O$_3$ particles having a molecular weight-dependent parameter α which has a value not less than 0.5 and is represented by the following formula:

$$As = K_1 \cdot M^\alpha$$

wherein M represents the number-average molecular weight of a binder resin, As represents the saturation adsorption of said binder resin, and $K_1$ represents a constant used for measuring As and dependent on tile binder resin and a solvent.

12. A magnetic recording medium comprising:

a non-magnetic substrate;

a non-magnetic undercoating layer consisting essentially of non-magnetic particles and a binder resin, coated on the surface of a substrate; and a magnetic recording layer composed of magnetic particles and a binder resin, and formed on said undercoating layer, said non-magnetic undercoating layer having a gloss at 45° of not less than 138%, and a center-line average surface roughness of not more than 19 nm, and consisting essentially of non-magnetic particles of $BaO \cdot 4.5Fe_2O_3$ having an average particle diameter of not more than 0.1 µm.

* * * * *